United States Patent
Bacci et al.

(10) Patent No.: US 11,883,873 B2
(45) Date of Patent: Jan. 30, 2024

(54) MACHINE TOOL WITH WORKING SURFACE DEFINED BY ORIENTABLE SUCTION CUPS

(71) Applicant: PAOLINO BACCI S.R.L., Cascina (IT)

(72) Inventors: Giuseppe Bacci, Pontedera (IT); Paolo Bacci, Pontedera (IT); Nino Bacci, Pontedera (IT)

(73) Assignee: PAOLINO BACCI S.R.L., Cascina (IT)

( * ) Notice: Subject to any disclaimer, the term of this patent is extended or adjusted under 35 U.S.C. 154(b) by 110 days.

(21) Appl. No.: 17/537,903

(22) Filed: Nov. 30, 2021

(65) Prior Publication Data

US 2022/0088666 A1   Mar. 24, 2022

Related U.S. Application Data

(63) Continuation-in-part of application No. 15/982,295, filed on May 17, 2018, now abandoned.

(30) Foreign Application Priority Data

May 18, 2017   (IT) .................. 102017000054039

(51) Int. Cl.
  *B21D 43/00*   (2006.01)
(52) U.S. Cl.
  CPC .................... *B21D 43/00* (2013.01)
(58) Field of Classification Search
  CPC ... B25B 11/00; B25J 15/0683; B25J 15/0616; B23Q 1/037; B23Q 1/265; B23Q 1/26; B23Q 3/088; B23Q 5/385; B23Q 39/028
  (Continued)

(56) References Cited

U.S. PATENT DOCUMENTS 4,838,531 A  *  6/1989  Corsi .................. B23Q 1/035
                                                    269/21
8,322,700 B2 * 12/2012  Saberton .............. B25B 11/005
                                                    29/559
(Continued)

FOREIGN PATENT DOCUMENTS

DE        20319159 U1 *  4/2004  ............. B23Q 1/032
WO    WO-2016124802 A1 *  8/2016  ............. B23Q 1/037

OTHER PUBLICATIONS

Machine translation of DE-20319159-U1 (Year: 2004).*
Machine translation of WO-2016124802-A1 (Year: 2016).*

*Primary Examiner* — Lee D Wilson
*Assistant Examiner* — Robert F Neibaur
(74) *Attorney, Agent, or Firm* — McGlew and Tuttle, P.C.

(57) ABSTRACT

The machine tool (1) having a work head (9) adapted to support a tool (21), a workpiece holder (30) having a two substantially parallel beams (31) arranged at a distance adjustable orthogonally to the longitudinal extension of the beams, a carriage (35) on each beam (31) movable along the longitudinal extension of the beam (31), on each carriage (35) a suction cup (39) for blocking the workpieces (P) to be machined. The position of each suction cup (39) with respect to the carriage (35) onto which the cup is mounted is adjustable by rotating around an axis (D-D) which is substantially orthogonal to a blocking surface, for blocking the workpieces, defined by the suction cups (39). To each suction cup (39) an actuator (46, 48) is associated, controlling the rotation of the suction cup (39) with respect to the carriage (35) onto which the cup is mounted.

18 Claims, 16 Drawing Sheets

(58) Field of Classification Search
USPC .......................................... 269/21, 20, 903
See application file for complete search history.

(56) References Cited

U.S. PATENT DOCUMENTS

| | | | | |
|---|---|---|---|---|
| 9,833,865 | B2* | 12/2017 | Stone | B23Q 1/4866 |
| 11,052,536 | B2* | 7/2021 | Jetté | B23Q 1/5462 |
| 2003/0015001 | A1* | 1/2003 | Tamburini | B23Q 3/088 |
| | | | | 65/158 |

* cited by examiner

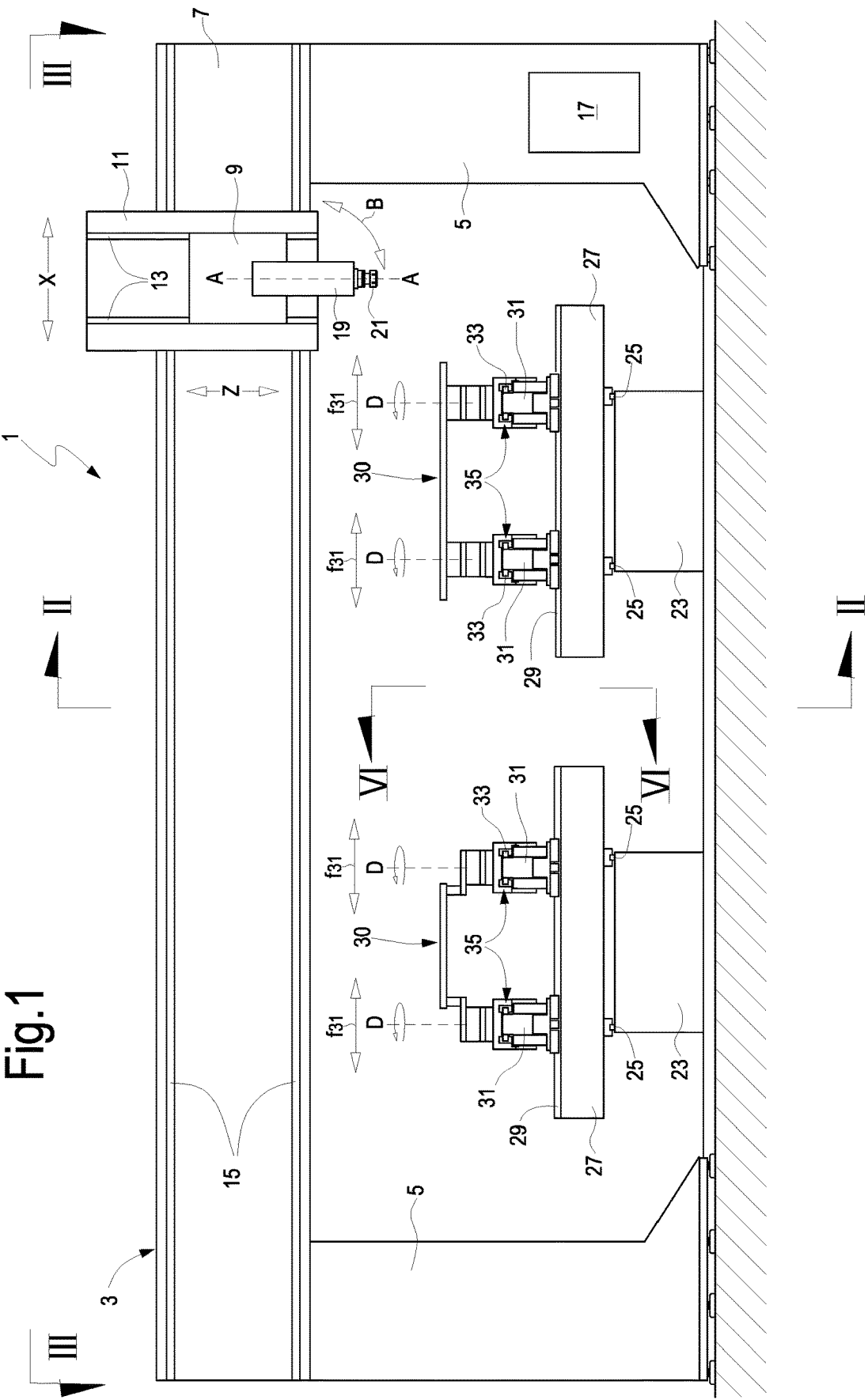

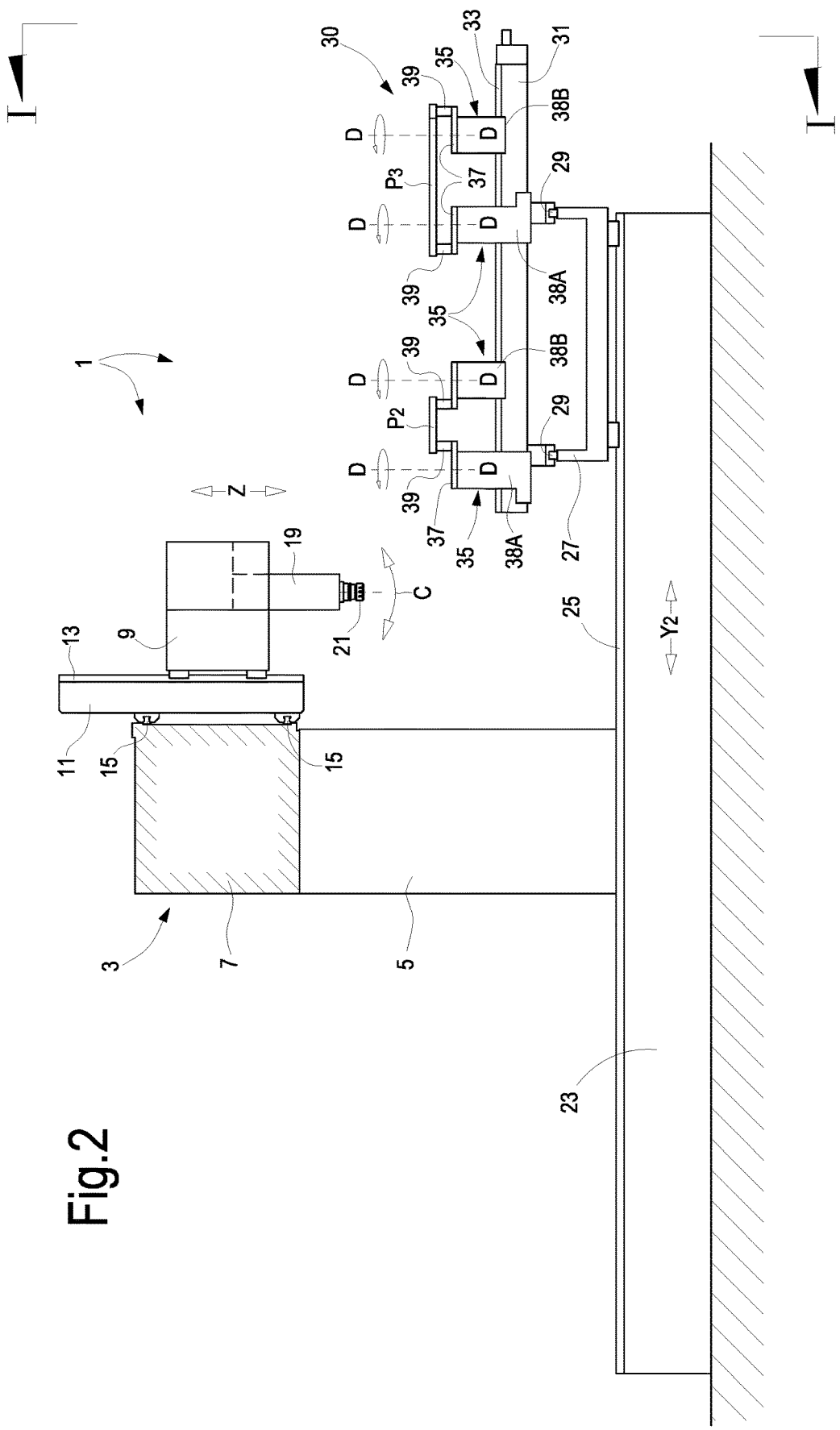

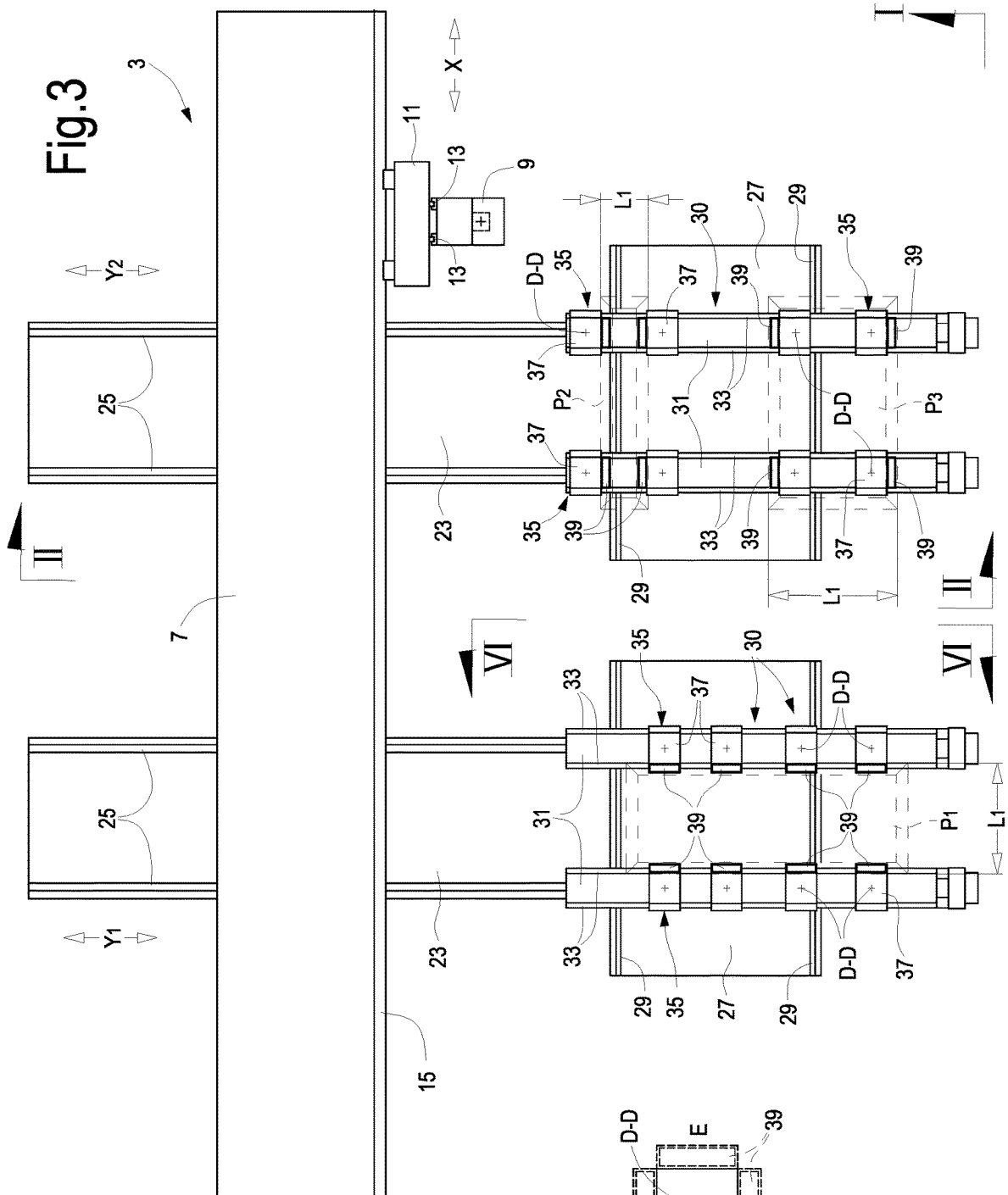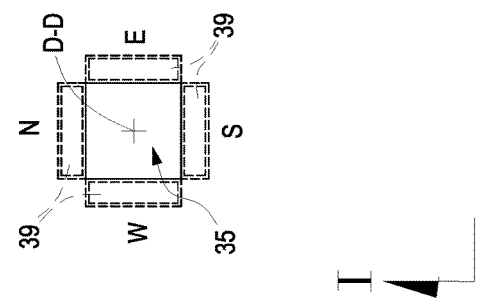

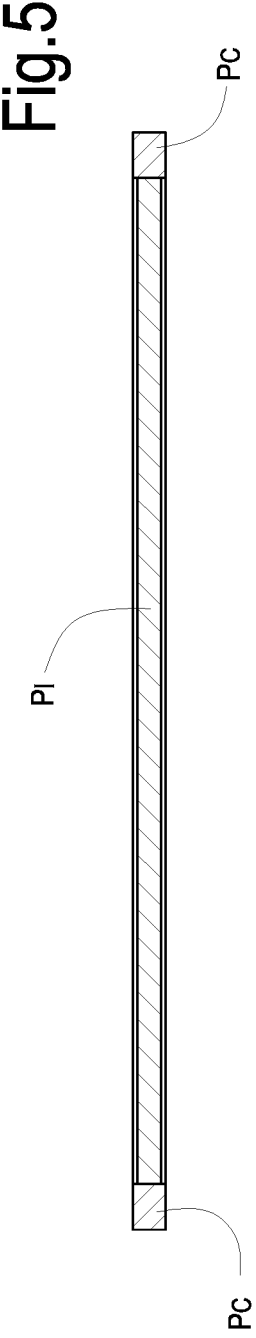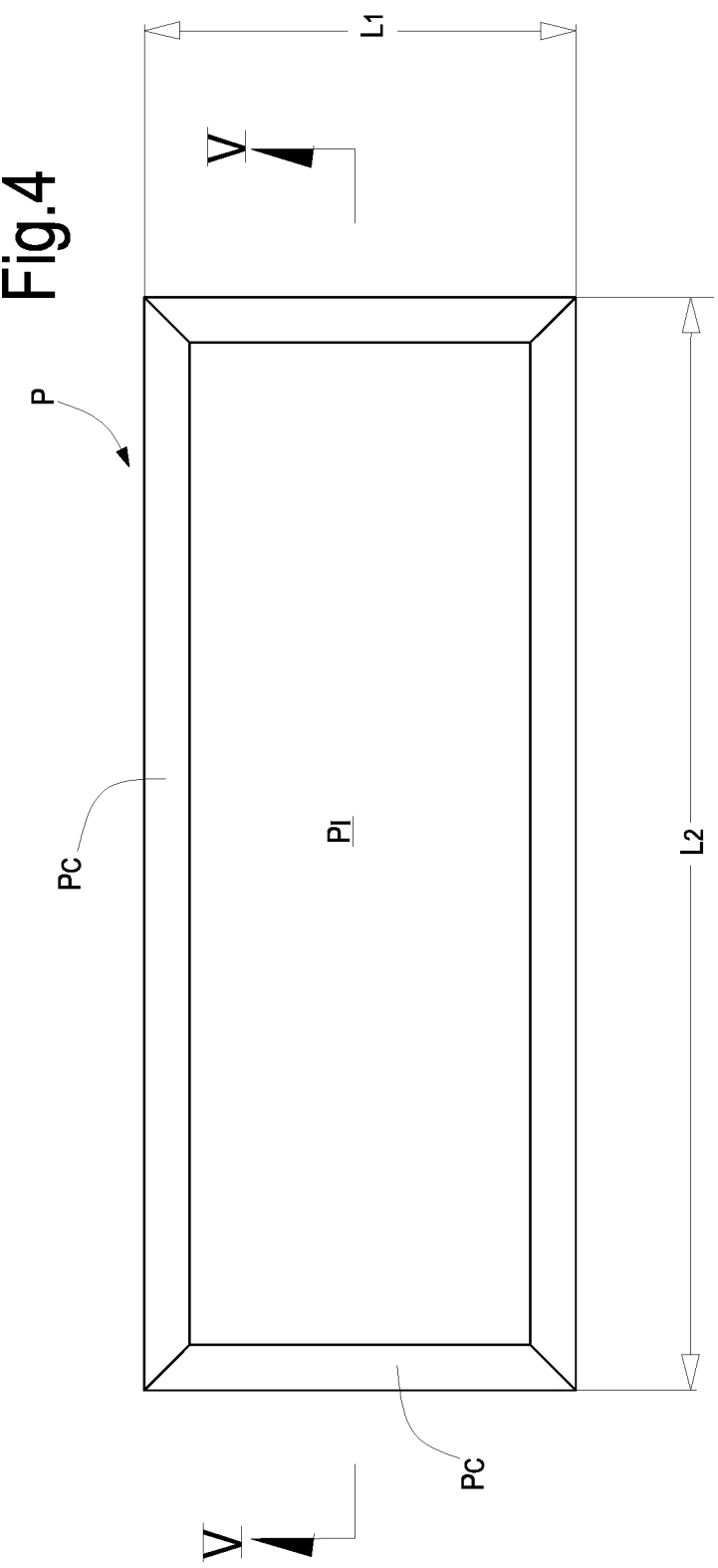

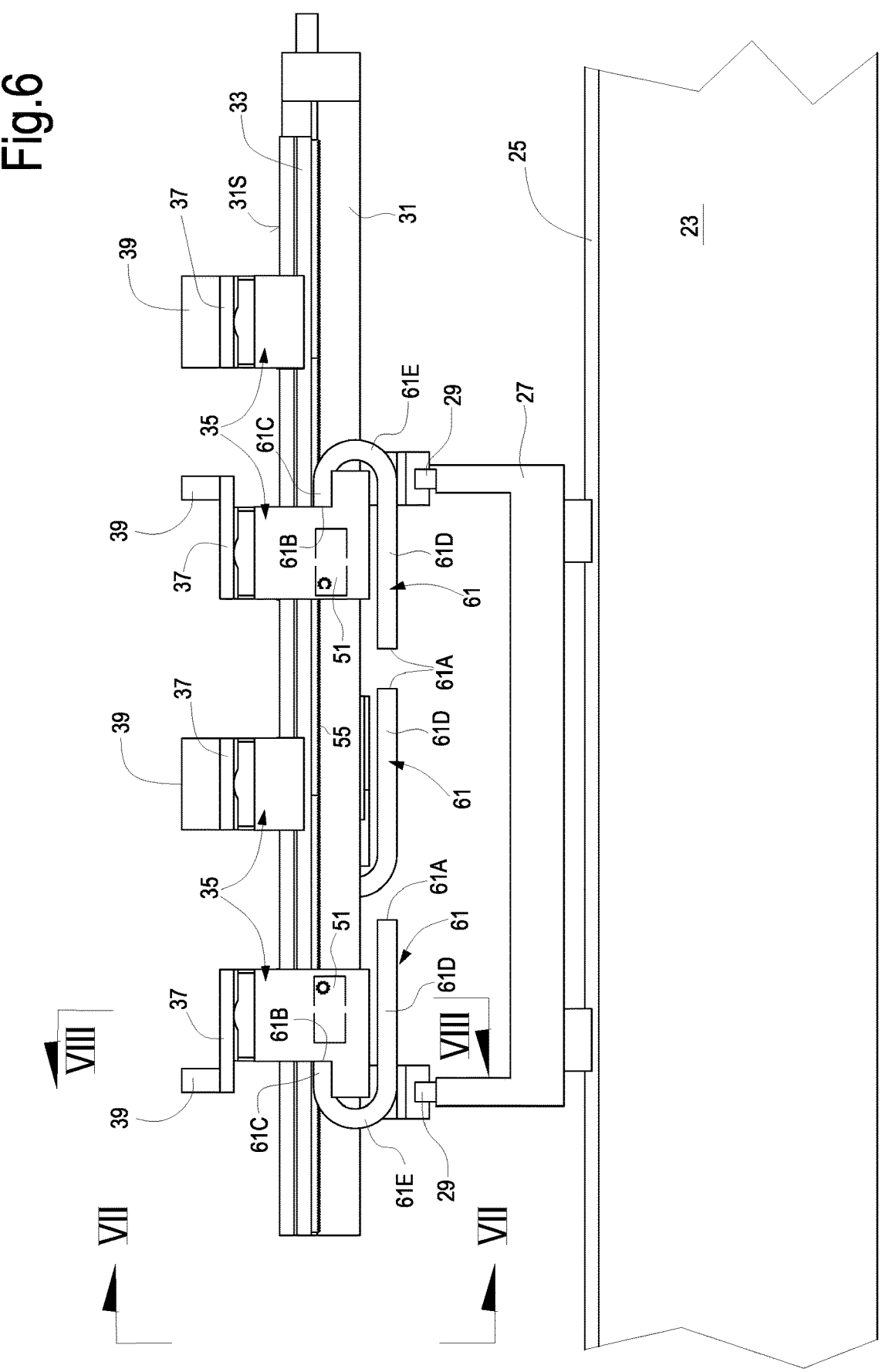

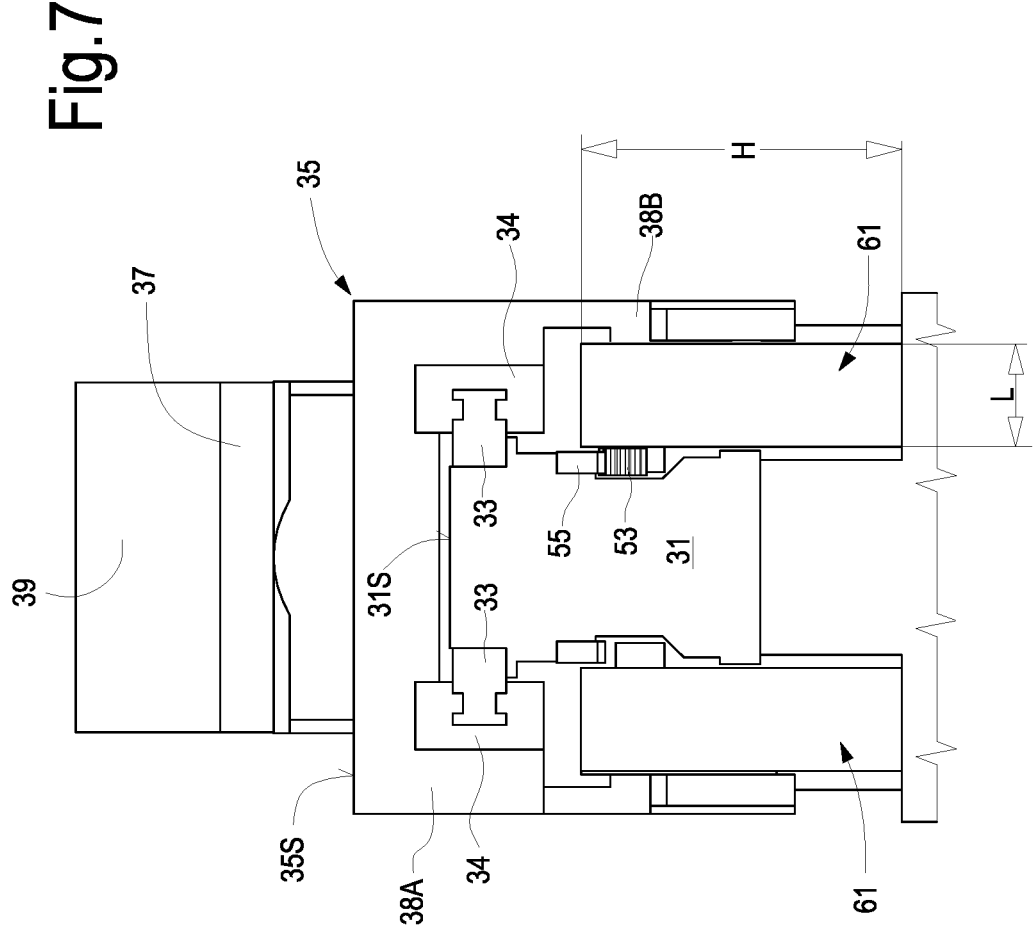

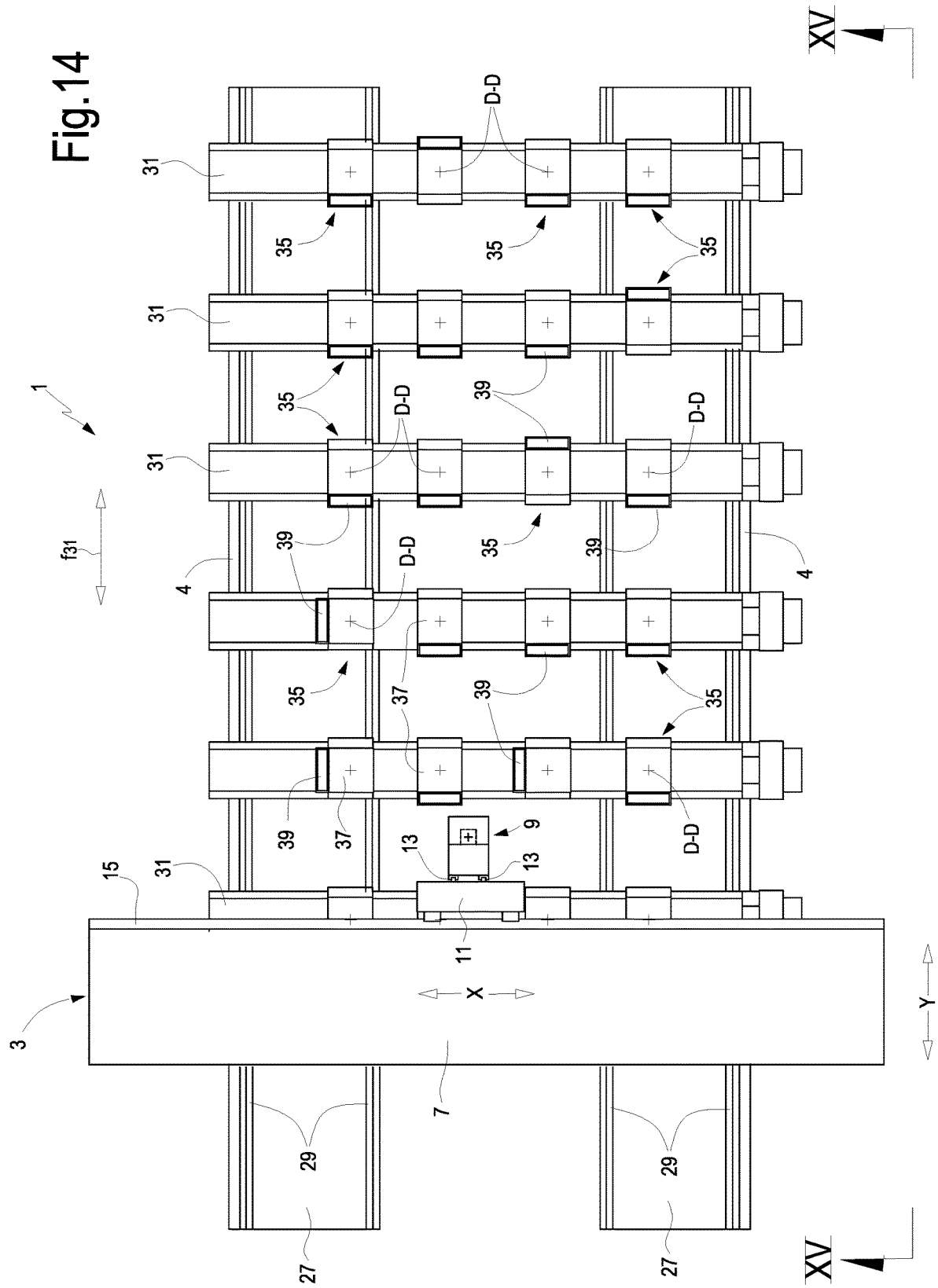

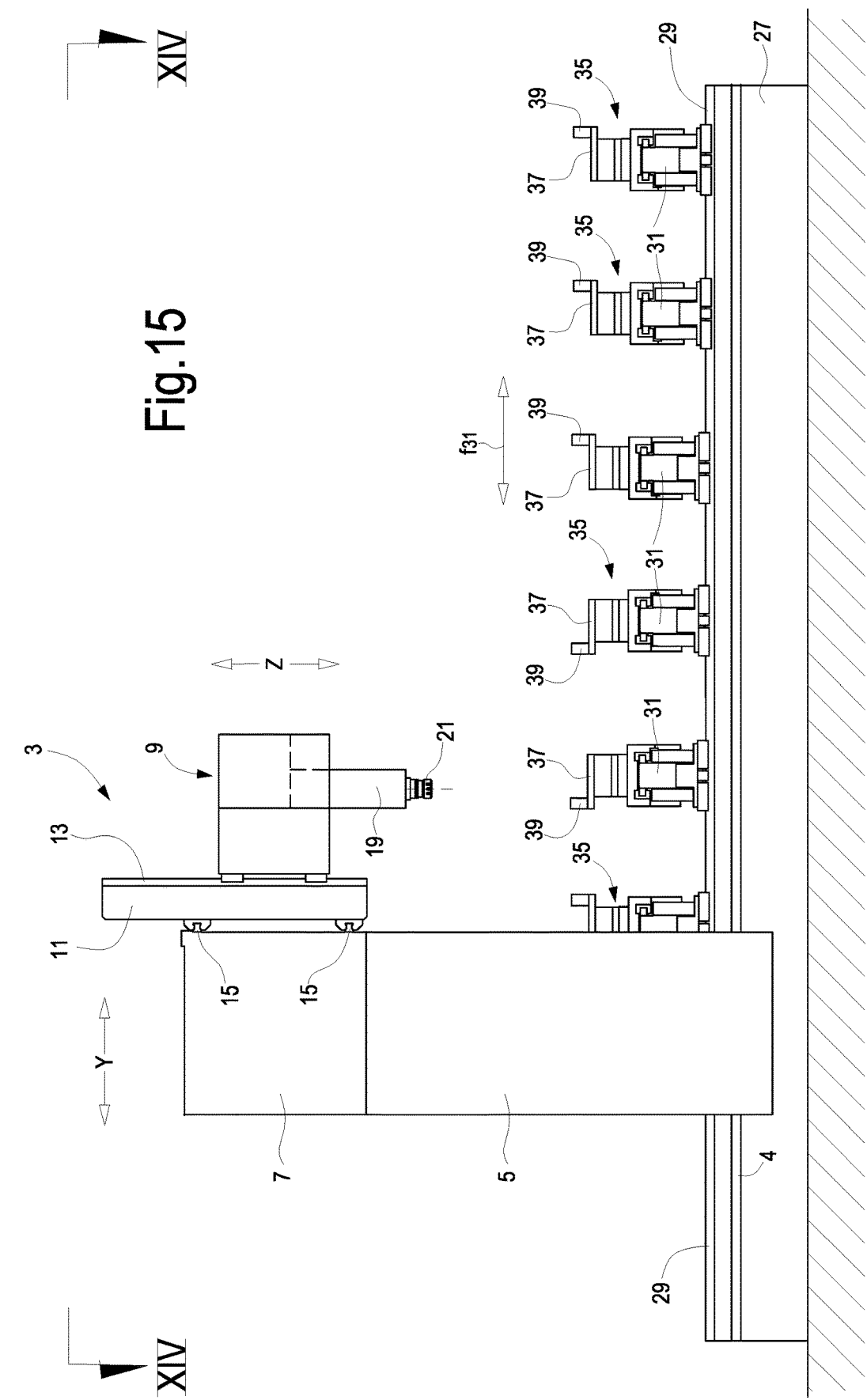

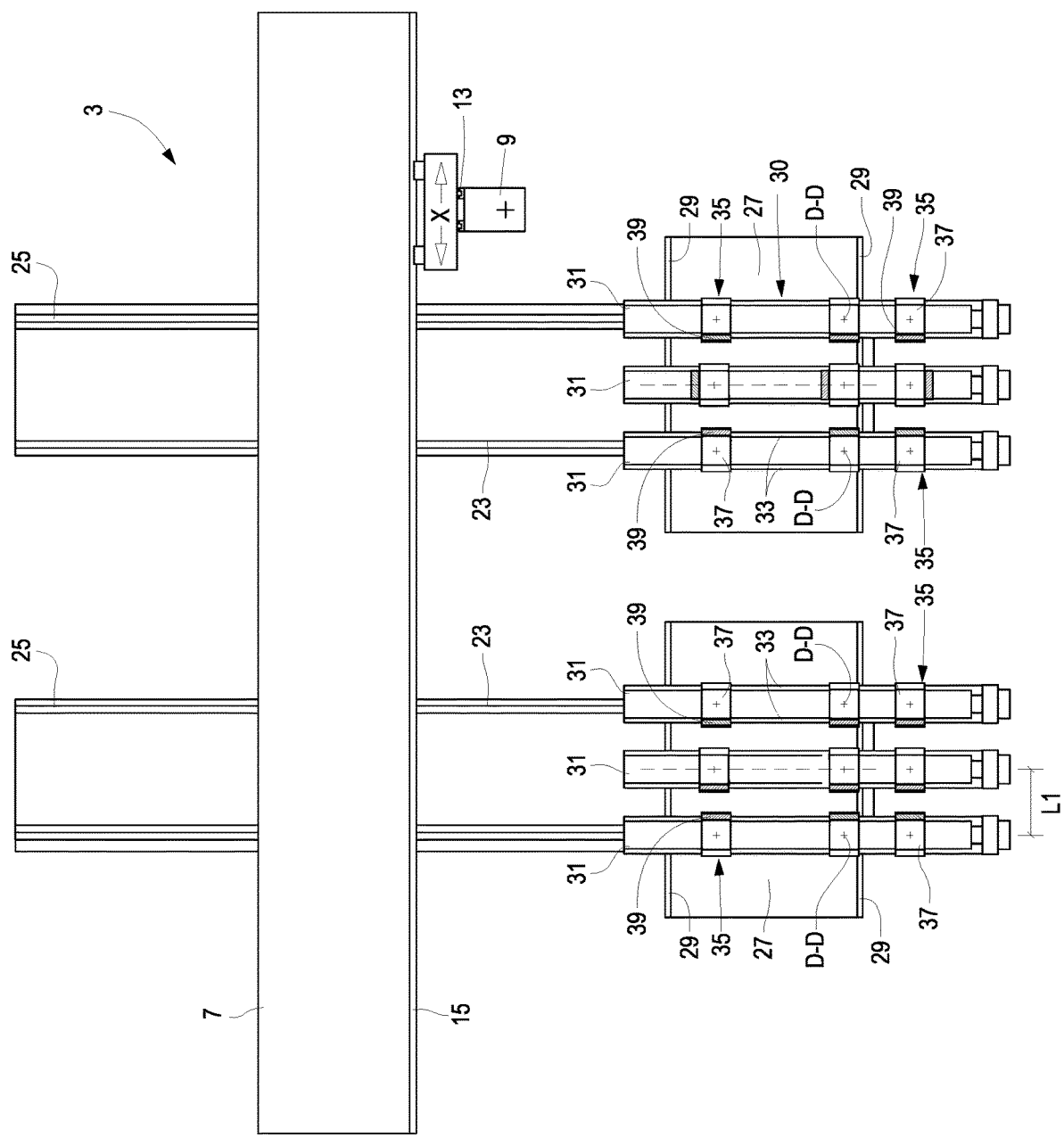

MACHINE TOOL WITH WORKING SURFACE DEFINED BY ORIENTABLE SUCTION CUPS

CROSS REFERENCE TO RELATED APPLICATIONS

This application is a continuation in part which claims the benefit of priority under 35 U.S.C. § 120 of U.S. application Ser. No. 15/982,295, filed May 17, 2018, which claims the benefit of priority under 35 U.S.C. § 119 of Italian Application 102017000054039, filed May 18, 2017, the entire contents of which are incorporated herein by reference.

TECHNICAL FIELD

The invention relates to improvements to machine tools. Embodiments described herein relate in particular to improvements to machine tools for machining panels or other flat workpieces.

In particular, improvements are described to the blocking members for blocking the workpieces on the machine tool.

BACKGROUND ART

For machining flat pieces made of various materials, for instance doors of pieces of furniture, panels or other articles, the use of numerically controlled machine tools, i.e. of machining centers, is well known, which are provided with workpiece holders comprising a plurality of blocking members for blocking the workpieces, these blocking members defining a blocking surface for the workpieces. In normal use, the blocking surface is usually horizontal.

The workpieces are machined by means of at least one work head than can be equipped with at least one rotating tool. The work head and the workpiece holder(s) (if the machine has more workpiece holders) are movable relative to each other according to a plurality of numerically controlled axes, to allow performing multiple working cycles.

In machine tools of this type, usually three numerically controlled translation axes are provided, orthogonal to one another. Typically, two numerically controlled translation axes define a plane parallel to the workpiece blocking surface, and a third axis extends orthogonally to the blocking surface. In some cases, one or more numerically controlled rotary axes are provided to machine the workpiece according to different angles.

Machine tools for machining panels typically comprise workpiece holders, each of which comprises at least one pair of parallel and substantially coplanar beams.

Usually, at least two carriages are arranged on each beam, each carriage carrying a suction cup for blocking the workpiece. The position of the carriages along the beams can be adjusted according to the workpiece shape and dimension. Similarly, also the mutual distance of the beams can be adjusted in a direction orthogonal to the longitudinal dimension, i.e. orthogonal to the longitudinal extension of the beams.

The suction cups are mounted in suitable positions on the carriages, according to the dimension and shape of the panels or other workpieces, as well as to the type of machining.

EP-A-2361738 and DE-U-202015004517 disclose examples of machine tools or machining centers of this type.

EP-A-2371488 discloses a beam for a machine tool of the type described above, on which carriages are mounted slidingly, the carriages carrying blocking members, for example suction cups, for blocking the workpiece. The beam is shaped so as to define, with its upper surface, a guide for the carriages.

Setting up of this type of machine tool requires long time, due to the various adjustments mentioned above. The smaller the batch of workpieces machined with a given machine setup, the more the time required for arranging the machine affects the overall machining time, and therefore the machining costs. A batch is comprised of identical workpieces that shall be subjected to the same machining and that therefore require the same setup of the machine tool.

In case of very small batches, comprised of only one or few workpieces, the set-up time greatly affects the overall time required for machining, resulting in higher production costs.

A need therefore exists, for improving the machine tools, in particular for machining panels or other flat workpieces, in order to reduce or overcome the drawbacks of the machines of the current art, in particular to reduce the set-up times.

SUMMARY OF THE INVENTION

According to an aspect, a machine tool is provided, comprising at least one work head adapted to support at least one tool, and at least one workpiece holder comprising two substantially parallel beams arranged at a distance adjustable orthogonally to the longitudinal extension of the beams. The machine tool further comprises, on each beam, at least one carriage movable along the longitudinal extension of the beam. On each carriage a suction cup is provided for blocking the workpieces to be machined. To achieve a faster set-up of the machine, in advantageous embodiments the position of each suction cup with respect the carriage onto which the cup is mounted is adjustable. The adjustment is done by rotating the respective suction cup, by means of an actuator, around an axis which is substantially orthogonal to a blocking surface for blocking the workpieces, which is defined by said suction cups.

In advantageous embodiments the actuator can be arranged inside the carriage which supports the suction cup.

The machine tool is particularly suitable for machining flat pieces, for example panels or the like, made of wood or other materials, for example light alloys, aluminum, plastic or the like.

The suction cups mounted on the two beams of the workpiece holder are advantageously substantially coplanar and define a planar blocking surface for the workpieces. In advantageous embodiments, the workpiece blocking surface is substantially horizontal.

In some embodiments, each suction cup is mounted eccentrically with respect to the respective carriage so that, by rotating the suction cup with respect to the carriage, the position of the eccentricity of the suction cup with respect to the carriage carrying the cup can be changed. For example, each carriage may have a quadrangular shape in a plan view, i.e. with four sides, two of which are parallel to, and two of which are orthogonal to, the longitudinal extension of the beam onto which the carriage is mounted. In advantageous embodiments, each suction cup is adjustable such that it can be arranged eccentrically with respect to the carriage carrying the cup selectively along at least two of said sides and preferably three sides, and more preferably all four sides, so as to take at least two, preferably three, and more preferably four alternative positions, which are eccentric with respect to the carriage.

The actuators controlling the rotation of the suction cups may be numerically controlled actuators, suitable to carry each suction cup in any position within a suitable angular range, for example of 90° or greater, preferably 360°. In simpler and more economical solutions, the position of the suction cups may be adjusted step by step among a plurality of preset angular positions, without the need for a numerical control. In some embodiments that are particularly advantageous from the viewpoint of bulks and costs, each suction cup may be angularly rotated by only 90° between two alternative positions.

In some embodiments, preferably when the suction cup is angularly rotatable by less than 360°, for instance by 90° only, the suction cup, each suction cup or some suction cups and the relevant carriage on which it is supported are adapted to mount the suction cup on the carriage in at least two angular positions selectively.

In advantageous embodiments, at least two carriages, and preferably more than two carriages, for example three or four carriages, are arranged on each beam. Each carriage may be provided with a respective rotatable suction cup. In some embodiments it is also possible to have some carriages provided with suctions cups and some carriages without suction cups. The suction cups may be applied in an easily removable manner, for example to set-up the machine tool with other types of pieces of equipment.

In embodiments described herein the two beams of each workpiece holder are mounted on adjusting guides for adjusting the reciprocal distance of the beams, the guides being orthogonal to the longitudinal extension of the beams. The adjustment of the distance between the beams may be manual or servo-assisted. To this end, in some cases a respective electronically controlled actuator may be provided, which can be controlled by the machine control unit.

The beams may be mounted on a stationary structure. In this case, all the numerically controlled movements necessary for the reciprocal movement of the work head and the workpiece may be assigned only to the work head. In other embodiments, the beams may be mounted on a slide movable along a numerically controlled translation axis so as to provide one of the relative movements between workpiece and tool.

The work head may be movable along at least two numerically controlled translation axes. In some embodiments more numerically controlled translation axes may be provided for the work head and/or the workpiece holder. One, two, or more numerically controlled rotary axes may be also provided, wherein preferably the movement is assigned to the work head or to a part thereof.

In general, the beams and the work head may be provided with a relative movement according to three numerically controlled translation axes, preferably orthogonal to one another, two of which define a plane parallel to the workpiece blocking surface defined by the suction cups.

Each carriage may be provided with a respective actuator controlling a movement for positioning the carriage along the respective beam onto which it is mounted.

Further advantageous features and embodiments of the machine tool are described below with reference to the attached drawing, and in the attached claims, forming an integral part of the present description.

BRIEF DESCRIPTION OF THE DRAWINGS

The invention shall be better understood by following the description and the accompanying drawing, which show non-limiting examples of embodiment of the invention. More in particular, in the drawing:

FIG. 1 is a front view, according to line I-I of FIGS. 2 and 3, of an embodiment of a machine tool, or machining center;

FIG. 2 shows a section according to the line II-II of FIGS. 1 and 3;

FIG. 3 shows a plan view according to III-III of FIGS. 1 and 2;

FIG. 3A shows a diagram of a carriage and a respective suction up of FIG. 3, showing the possible angular positions that the suction cup can take relative to the carriage;

FIG. 4 is a plan view of a panel to be machined by means of the machine tool of FIGS. 1, 2 e 3;

FIG. 5 shows a section according to V-V of FIG. 4;

FIG. 6 is a side view of an enlargement according to VI-VI of FIGS. 1 and 3 of a beam with respective carriages and suction cups;

FIG. 7 is a front view according to VII-VII of FIG. 6;

FIGS. 14 and 15 show a diagram of a machine tool with a movable work head and fixed beams, wherein FIG. 14 is a plan view according to XIV-XIV of FIG. 15 and FIG. 15 is a side view according to XV-XV of FIG. 14; and FIG. 16 is a plan view of a further embodiment of a machine tool.

DETAILED DESCRIPTION OF EMBODIMENTS

Figure 8:
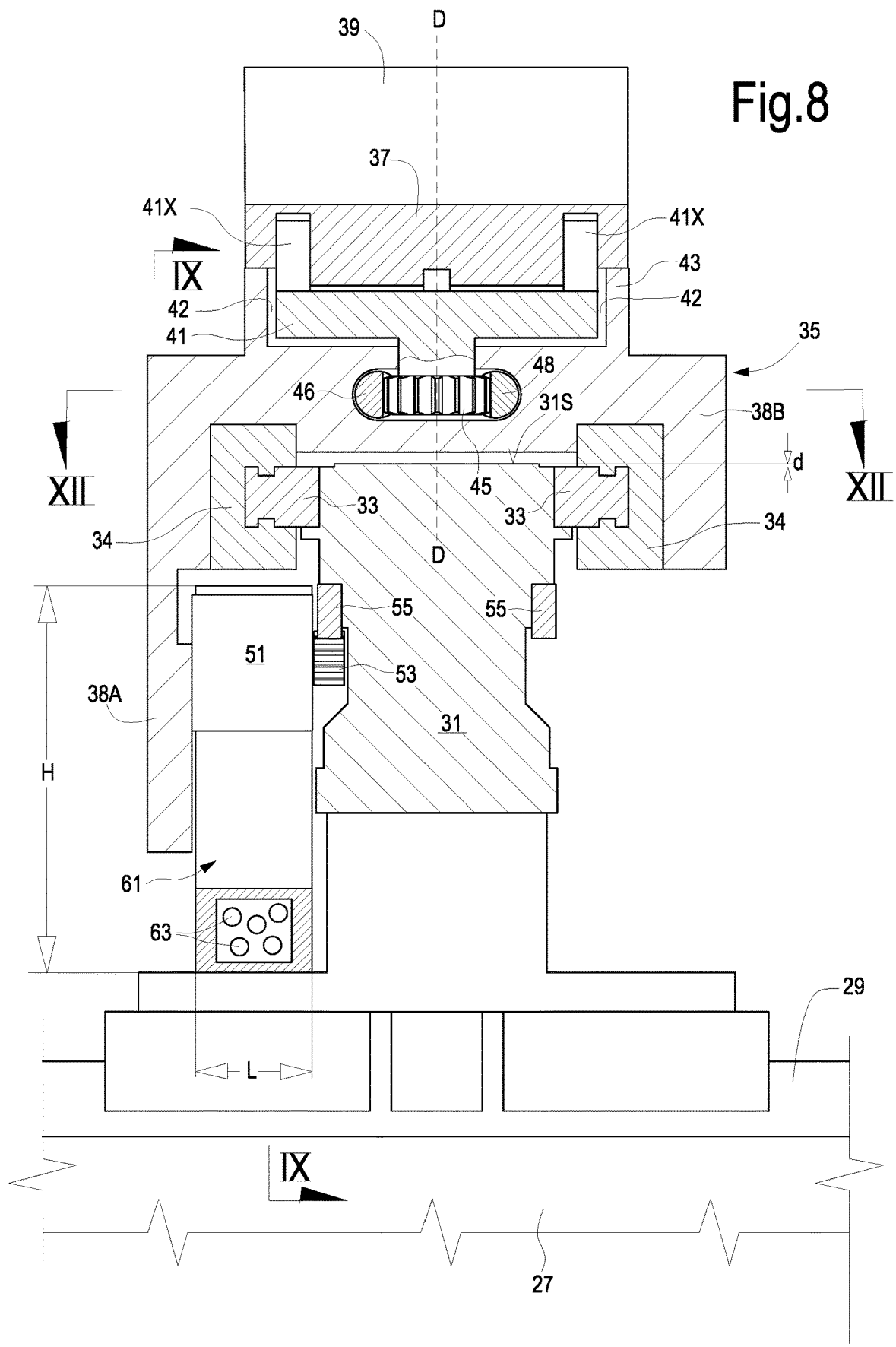
FIG. 8 shows an enlarged cross-section according to line VIII-VIII of FIG. 6.
Figure 9:
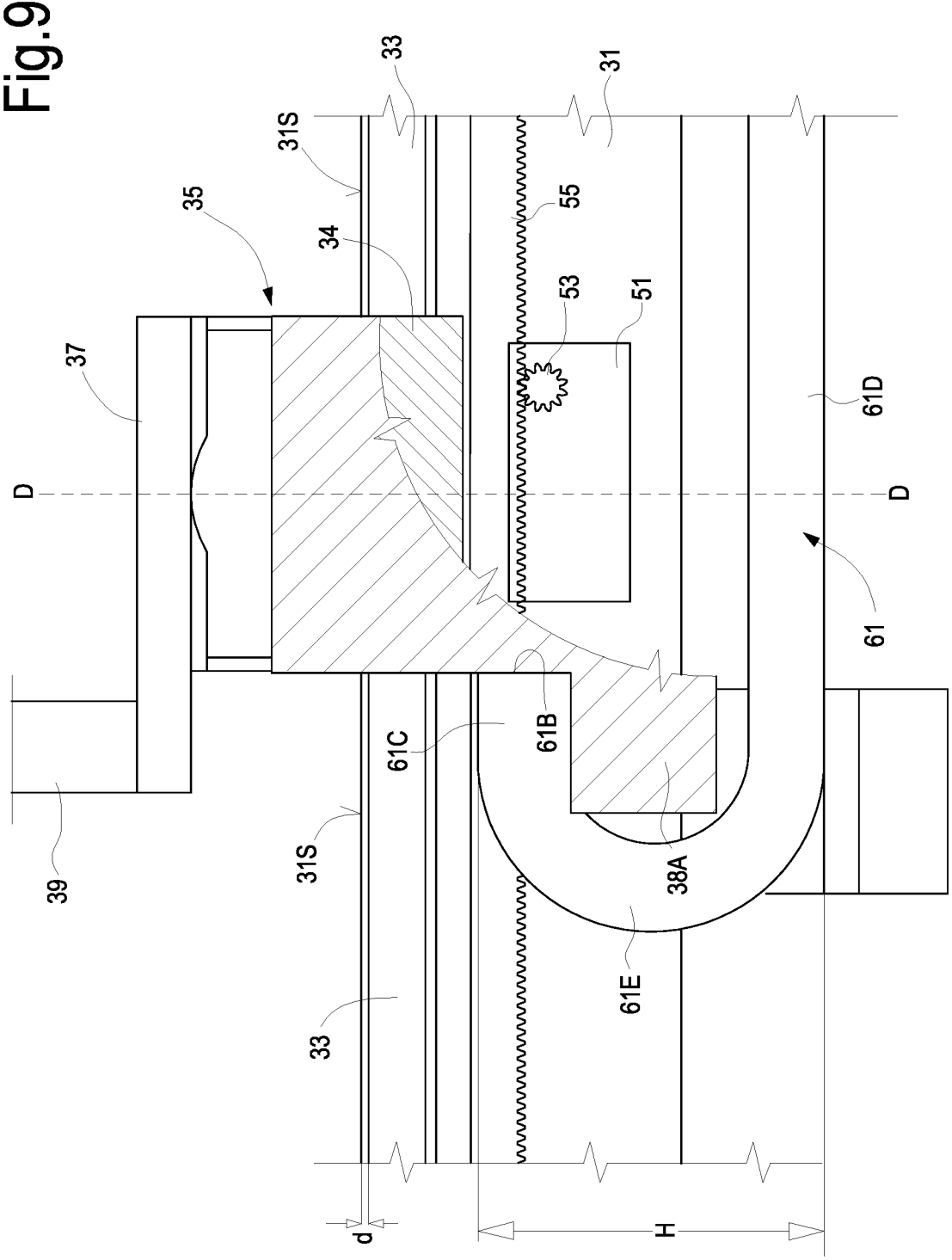
FIG. 9 is a schematic cross-section according to IX-IX of FIG. 8.

The detailed description below of exemplary embodiments is made with reference to the attached drawing. The same reference numbers in different drawings identify equal or similar elements. Moreover, the drawings are not necessarily to scale. The detailed description below does not limit the invention. The protective scope of the present invention is defined by the attached claims.

In the description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular features, structures or elements can be furthermore combined in any adequate way in one or more embodiments.

FIGS. 1, 2 and 3 show three views of a machine tool or machining center in a possible embodiment. The machine tool is indicated as a whole with number 1. In the illustrated embodiment, the machine tool 1 is a gantry machine. It has a gantry 3 with uprights 5 and a crossbar 7. A work head or operating head 9 is mounted movable on the crossbar 7. The work head 9 may be mounted on a slide 11 by means of sliding guides 13 that are oriented vertically, i.e. orthogonally to the crossbar 7. The slide is movable along the crossbar 7 by means of sliding guides 15 parallel to the crossbar 7.

The work head 9 may be provided with a movement numerically controlled by a central control unit schematically indicated with 17. More in particular, the work head 9 may move according to a first numerically controlled translation axis X, parallel to the crossbar 7 and to the guides 15, and according to a second numerically controlled translation axis Z, vertical and parallel to the guides 13.

The work head 9 may bear one or more electro-spindles that can be provided with one or more rotating tools. In the diagram of FIGS. 1, 2 and 3 only one electro-spindle 19 is shown, carrying a single tool 21, rotating around an axis A-A substantially parallel to the numerically controlled axis Z.

The gantry structure of the machine tool 1 described above is only one of the possible configurations of the machine tool. In further embodiments, the machine tool may have a column structure, wherein the work head is supported by a vertical upright that can be fixed or horizontally movable according to a numerically controlled axis X, and where the work head can be vertically movable according to a numerically controlled axis Z.

In the illustrated embodiment the work head 9 may be devoid of numerically controlled rotary axes. In further embodiments, the work head 9 may be provided with one or more, for instance two numerically controlled rotary axes. By means of these numerically controlled rotary axes it is possible to impart rotation movements to the electro-spindle 19, and therefore to the tool 21, according to the arrows B and C schematically shown in FIGS. 1 and 2.

In some embodiments, one of which will be described below, the work head 9 may be adapted to move according to a third numerically controlled translation axis, orthogonal to the axes X and Z.

In the illustrated embodiment, two substantially parallel bases 23 are associated with the gantry 1. In other embodiments only one base may be provided. In the illustrated embodiment, each base 23 extends in horizontal direction substantially at 90° with respect to the crossbar 7, and extends below said crossbar.

In other embodiments, not shown, only one base 23 may be provided, which can be arranged substantially at the centerline of the gantry 3.

On each base 23 guides 25 may be provided, along which respective slides 27 move. The movement of each slide 27 may be controlled according to a third numerically controlled translation axis, indicated with Y1 and Y2 for the two slides 27.

In some embodiments, the slides 27 are actuated according to a swinging cycle: when a slide 27 is in work position, in the work area of the work head 9, the other slide 27 is in a workpiece load and/or unload position, spaced from the work head 9. In FIGS. 2 and 3 the two slides are shown both in the load and/or unload position.

In the illustrated embodiment, on each slide 27 guides 29 are provided, that can be oriented at 90° with respect to the guides 25. In other embodiments, the guides 29 may be parallel to the guides 25.

In the illustrated embodiment, on the guides 29 of each slide 27 two beams 31 are provided, that have a longitudinal extension (i.e. the greater dimension) orthogonal to the guides 29. Each beam 31 is adjustable along the guides 29 according to the double arrows f31. In this way it is possible to adjust the position of the beams 31 relative to the slide 27 and the reciprocal distance between the beams 31 in the direction of the guides 29.

In general, in the present description and in the attached claim, beam or bar means a support extending longitudinally and having a longitudinal dimension greater than the remaining transverse dimensions. The beam may be made of a single piece, or it may be comprised of more components assembled together to form a rigid structure, for example by means of welding, screwing or in any other suitable manner.

With the described configuration, it is possible to move workpieces mounted on the beams 31 as described below relative to the work head 9 and to the tool 21 according to three numerically controlled translation axes X, Y1 (Y2), Z. The movements are imparted partly to the work head 9 (axes X, Z) and partly to the workpieces (axis Y1 or Y2). In further embodiments, the work head 9 may be provided with movements according to three numerically controlled translation axes X, Y, Z, whilst the beams 31 on which the workpiece is blocked may be mounted on a fixed structure instead of on a slide 27 movable along the axis Y1 or Y2, however ensuring the possibility of adjusting the reciprocal distance between the beams 31. An embodiment of this type will be described below.

On each beam 31 guides 33 are provided, along which one or more carriages 35 move. In some embodiments, one or both the guides may be made in a single piece with the beam 31, i.e. made from a single block. In other embodiments, one or both the guides 33 may be attached to the respective beam 31. As shown in the attached drawing, the two guides 33 may be practically arranged on the two longitudinal sides of the respective guide 31, i.e. on the sides extending parallel to the longitudinal extension of the beam.

The guides 33 may be advantageously along the longitudinal sides of the respective beam 31, so as to leave the preferably flat upper surface 31S of the beam 31 completely free. In some embodiments, as shown in the attached drawing, the guides 33 are arranged so as to be distanced from the surface 31S of the respective beam 31. Each carriage 35 may have at least two opposite guiding shoes 34 engaging the guides 33 at opposite sides of the respective beam 31. The guiding shoes 34 may be carried by two side panels 38A, 38B of the carriage (see in particular FIGS. 2, 8, 11). In some embodiments, the guiding shoes 34 may be made in a single piece with the respective carriage 35, i.e. the guiding shoes 34 and the carriage 35 may be made of a single block. The two side panels 38A, 38B may have different heights. For example, the side panels 38A may extend farther downwards than the side panels 38B.

The upper flat surfaces 31S of the beams are preferably continuous. In the present description and the attached claims, the term "continuous" means that the upper surface has two opposite ends, along the longitudinal extension of the beam, between which the upper surface extends continuously and without interruption, so as to continuously support any piece of equipment fixed on the beam 31. The continuous upper surface 31S has not necessarily constant width. For example, along the extension of the beam on the upper surface 31S thereof holes, notches or the like may be provided for example to form points or elements for coupling blocking pieces of equipment for blocking the workpieces. However, these holes, notches or similar non-uniformities never interrupt completely the extension of the continuous upper surface, i.e. they do not affect the whole width of the upper surface of the beam 31.

A continuous upper surface 31S of this type allows a better fastening of the pieces of equipment, avoiding the risks of bending deformations thereof.

In the illustrated embodiments, four carriages 35 for each beam 31 are provided. It should however be understood that the number of carriages 35 for each beam 31 may be different. For example, one, two three, or more than four carriages 35 for each beam 31 may be provided. The position of each carriage 35 along the respective beam 31 may be adjustable and blockable.

Each of the adjustments mentioned above, i.e. of the position of the beams 31 on the slides 27 and of the carriages 35 on the beams 31, may be manual or servo-assisted. The adjustments are preferably servo-assisted and controlled by means of electronically controlled servo-motors, so that the operator can set the positions and the reciprocal distances of the beams 31 on the slides 27, as well as the positions of the carriages 35 on each beam 31 according to the shape and size of the workpieces to be machined. Examples of positioning are described below. If the machine tool 1 is provided with two or more slides 27, the position of the beams 31 and of the carriages 35 may be different for the slides 27.

In some embodiments a servo-motor for each beam 31 may be provided. In this case, the beams 31 may be positioned along the guides 29 more quickly by moving the beams 31 simultaneously. In other embodiments, a single actuator may selectively move one or the other of the beams 31 of a same workpiece holder 30. To this end an electric motor may be for instance provided, that actuates a drive member, such as a threaded bar or a belt. The beams may be provided with members for selectively coupling to the drive member. The single beams are fastened to the drive member in different time intervals, and therefore they can be moved one after the other by means of the same actuator. Using a single actuator the machine has a lower cost, but requires longer set-up times.

Similar alternatives may be provided for the carriages. In some embodiments a servo-motor for each carriage 35 may be provided. In this case, the carriages 35 may be positioned along the beams 31 more quickly by moving the carriages 35 simultaneously. In other embodiments, a single actuator selectively moves one or the other of the carriages 35 associated with the same beam 31. To this end, an electric motor may be for instance provided for each beam 31, that actuates a drive member, such as a threaded bar or a belt. The drive member may extend parallel to the respective beam 31 and the carriages 35 may be provided with members for selectively coupling to the drive member. The single carriages are fastened to the drive member in different time intervals, and therefore they can be moved one after the other along the beam 31 by means of the same actuator. Using a single actuator the machine has a lower cost, but requires longer set-up times.

The set comprised of each slide 27 (or other stationary structure carrying the beams 31) and related components carried thereby, including the beams 31 and the carriages 35, constitutes a respective workpiece holder 30 for supporting an blocking the workpieces to be machined by means of the work head 9.

To fasten a workpiece on a workpiece holder 30, each carriage 35 has an upper surface 35S (see in particular FIGS. 7 and 8), on which at least one blocking member 37 may be provided. In the illustrated embodiment, each blocking member comprises a suction cup 39, see in particular FIGS. 6 and 7.

In the present description and the attached claims the term "suction cup" generically refers to a vacuum blocking means, i.e. Wherein the workpiece is blocked by generating a negative pressure in a closed volume, at least partially delimited by the workpiece, which in this way remains adhering the blocking member.

Each suction cup 39 is preferably mounted so as to be eccentric with respect to the respective carriage 35. Each suction cup 39 may be oriented so as to project, with respect to the carriage 35 on which it is mounted, from different sides of the carriage. This is shown in detail in FIG. 3 and the reason thereof will be explained below. FIG. 3 shows a top view of the two pairs of beams 31 mounted on the two slides 27. The suction cups 39 of the carriages 35 mounted on the four beams 31 are oriented differently. More in particular, starting from the beam 31 on the left, the arrangement of the suction cups 39 with respect to the carriages 35 is as follows: the first beam 31 carries carriages 35 whose suction cups 39 eccentrically project toward the opposite beam 31, i.e. they are arranged outside the right side (in the figure) of the respective carriage 35; the suction cups 39 of the second beam 31 are arranged outside the left side (in figure) of the respective carriages, i.e. outside the side closest to the beam 31; on the third beam 31, the suction cups 39 of the two carriages 35 closest to the gantry 3 are arranged eccentrically with respect to the carriages 35 and facing each other; on the two carriages 35 farthest from the gantry 3, the respective suction cups are arranged outside the two farthest sides of the carriages, so as to be most spaced from each other; on the fourth beam 31 the suction cups 39 are arranged in the same way as on the third beam.

FIG. 3A schematically shows a carriage 35 and, in broken line, the four possible positions the suction cup 39 can take. The four positions are indicated with N, S, E, W and correspond to the four sides of the carriage 35 that, in this embodiment, has substantially quadrangular flat shape in a top view. Practically, the suction cup 39 may be arranged eccentrically with respect to the carriage outboard any one of the four sides of the carriage.

Using the references listed above, and with reference to FIG. 3 again, all the suction cups 39 of the first beam 31 are in position W; all the suction cups 39 of the second beam 31 are in position E; the suction cups 39 of the third and of the fourth beam 31 are arranged in the following sequence, starting from the position closest to the gantry 3 and ending with the farthest one: S, N, N, S.

The suction cups 39 associated with each workpiece holder 30 may be substantially coplanar and thus define a planar blocking surface for the workpieces to be machined. All the suction cups 39 are preferably at the same distance from a floor on which the machine tool 1 is installed, so that the planar workpiece blocking surface is horizontal.

Each blocking member 37 with the respective suction cup 39 may be advantageously mounted on the respective carriage 35 in a rotatable manner around an axis D-D, which is orthogonal to the planar workpiece blocking surface. In some embodiments, each blocking member 37 is mounted so as to rotate by 360° around the axis D-D. However this is not mandatory. In some embodiments, each blocking member 37 may be mounted so as to rotate only by 180°, or only by 90° around the respective axis D-D.

The rotation of the blocking members 37 and of the respective suction cups 39 around the axis D-D with respect to the carriage 35 may be provided by means of a numerically controlled servo-motor, not shown, which is controlled by the central control unit 17. In this case, each suction cup 39 may be can take any angular positions around the axis D-D.

In other embodiments, the rotation is controlled by means of a simpler actuator, that may provide a fixed number of working positions, for example two, three or four working positions, angularly offset by 90° with respect to one another. The adjustment of the angular position may be also provided in a different way for different carriages, for example it may be performed by means of a numerically controlled actuator on some carriages and by means of an actuator with preset multiple positions on other carriages. Moreover, one or more additional suction cups may be provided, mounted in a fixed way or in a manually adjustable way.

The object of angularly adjusting the suction cups 39 around the axes D-D can be better understood in view of what described below with particular reference to FIGS. 3, 4 and 5. In FIGS. 4 and 5 a generic workpiece P to be machined is shown. This is usually a flat workpiece, for example a panel or a door of a piece of furniture. The workpiece P may have an inner or central portion or area PI, surrounded by a frame PC. The dimensions L1 and L2 of the workpiece P may be very variable and in some cases the lower dimension L1 may be very small, for example in the order of 10-20 cm. In some cases, the surface that can be gripped by the suction cups 39 may be only the frame PC of the workpiece P.

In FIG. 3 just by way of example three workpieces P1, P2, P3 are shown. The workpiece P1 has a greater dimension L2 substantially larger than the lower dimension L1 and such as to require a high number of suction cups 39 to be blocked. In the illustrated example, eight suction cups 39 are used, mounted on the two beams 31 of the workpiece holder 30. As the lower dimension L1 of the workpiece P1 is very reduced, in order to arrange the suction cups 39 along the long sides of the frame PC, the suction cups are oriented in the positions W for the left suction cups and in the positions E for the right suction cups (in the Figure), so as to reduce the distance between suction cups of each pair, keeping the two beams 31 at a suitable distance such that the beams do not interfere with each other.

The workpiece P2 has significantly smaller dimensions than the workpiece P1, and is blocked using the suction cups 39 of two carriages 35 of the left beam 31 and the suction cups 39 of two carriages 35 of the right beam 31 of the respective workpiece holder 30. The other two pairs of carriages 35 are used to block the workpiece P3.

In order to optimize the position of the suction cups on the carriages 35 that support the workpiece P2, the suction cups 39 are arranged in the positions S for the two carriages 35 closest to the gantry 3 and in the positions N for the two carriages 35 farthest from the gantry 3. The blocking of the workpiece P3 occurs by means of complementary positions of the suction cups 39, i.e. with the suction cups closest to the gantry 3 in position N and the suction cups farthest from the gantry 3 in position S. By selecting the positions of the suction cups 29 as described above, it is possible to block the workpieces in an optimal manner, with the suction cups acting on the frames of the workpieces.

As it is clearly understood from FIGS. 3 and 3A, the position of the suction cups 39 with respect to the carriages 35 may be adjusted so as to carry each suction cup into one of the four positions E, W, N, S that are eccentric with respect to the carriage 35 according to the dimensions L1, L2 of the workpiece P. In case of small batches of workpieces P to be machined, it is necessary quickly to change a set-up of the workpiece holder 30, passing to a new set-up quickly, in order not to significantly affect the duration of the work cycles. To this end, as described above, the blocking members 37 with the respective suction cups 39 are mounted on the respective carriages 35 so that they can rotate by at least 90° between at least two different positions, for example S, W or S, E, or W, N or N, E. Preferably, the rotation is of 180° so that each suction cup 39 can take three of the four positions N, S, E, W with respect to the carriage 35 on which the suction cup is mounted. To have maximum flexibility in setting the workpiece holder 30, each suction cup 39 can take selectively any one of the four positions N, S, E, W, or even any intermediate angular position between the four mentioned positions.

The rotation and fixing of the blocking members 37 may be performed by means of respective numerically controlled electric motors and, if necessary, a brake. In other embodiments, an actuator with two, three or four fixed positions may be used.

Figure 12:
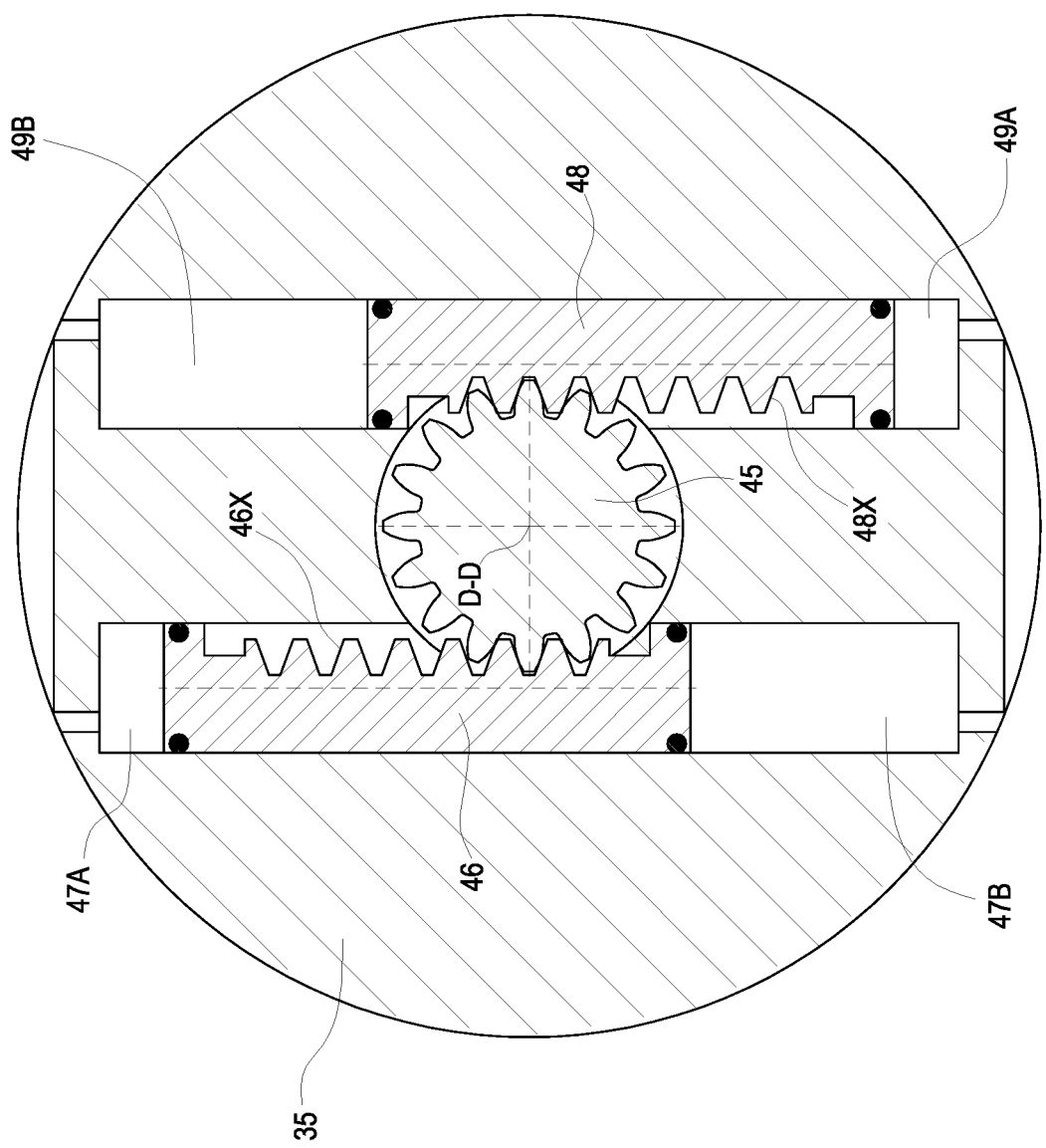
FIG. 12 is a schematic cross-section according to XII-XII of FIG. 8.

In FIGS. 8 and 12 a diagram is shown of a possible mechanism to achieve a 90° rotation of the suction cups 39 with respect to the carriage 35 on which the cups are mounted. In this embodiment, each blocking member 35 is rotatable coupled to a rotor 41 controlling the rotation of the blocking member 37 by 90° around the axis D-D. The rotor 41 may be rotatably housed in a seat 43 of the carriage 35 and may be torsionally coupled to a pinion 45. Two rack segments 46X, 48X co-act with the pinion 45, said segments being provided on two respective cursors 46, 48 that are in turn housed in chambers 47, 49 (see FIG. 12). Each chamber 47, 49 is subdivided by the respective cursor 46, 48 into two semi-chambers 47A, 47B and 49A, 49B. By alternatively supplying a pressurized fluid, for example air, into the semi-chambers 47B and 49A, or into the semi-chambers 47A and 49A, it is possible to push the cursors 46, 48 in any one of two opposite positions thus causing the rotation of the respective suction cup 39 around the axis D-D by means of the racks 46X, 48X, which mesh with the pinion 45.

Figure 11:
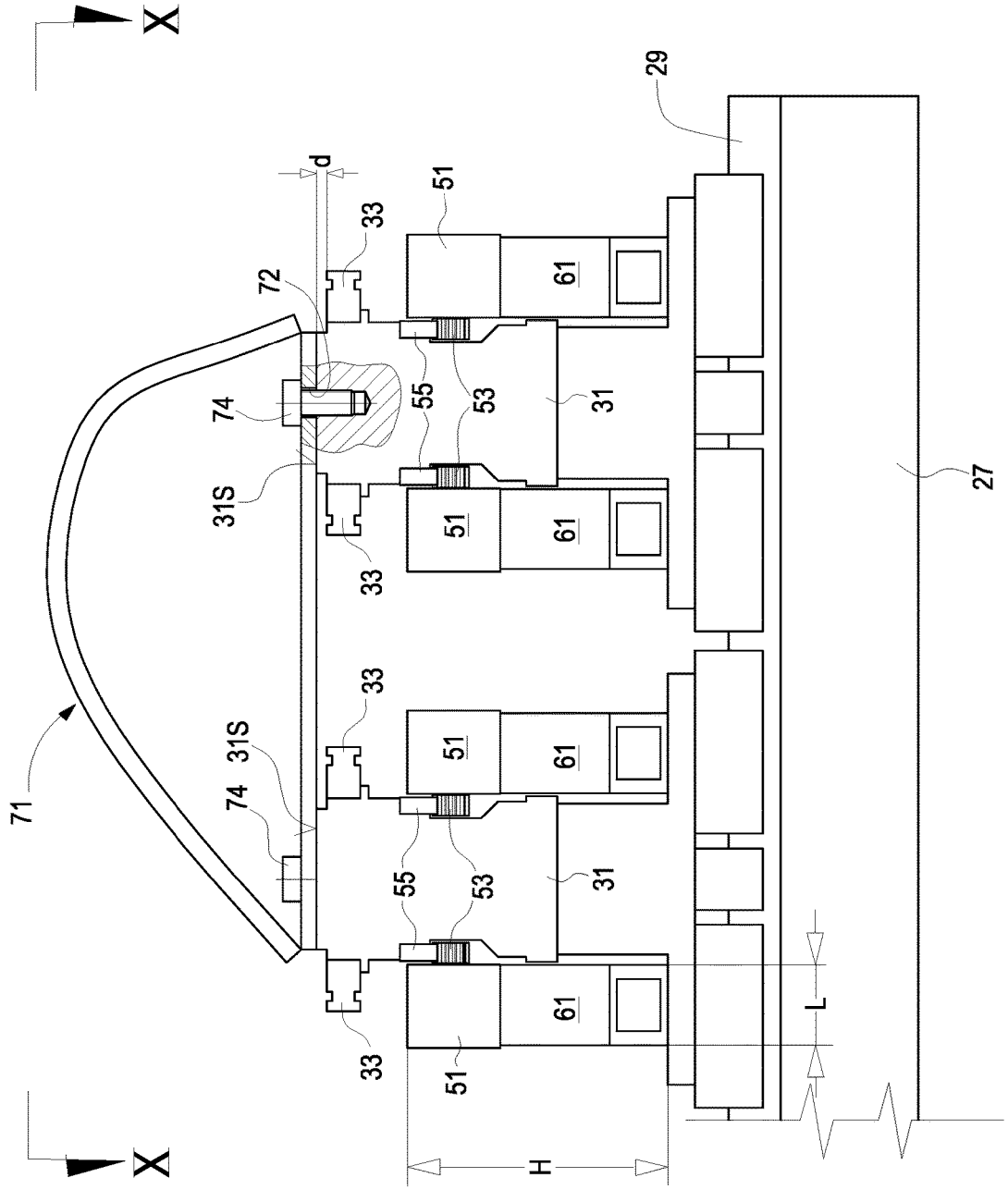
FIG. 11 is a schematic view according to XI-XI of FIG. 10.

The rotor 41 may be provided with a front coupling 41X for coupling to the blocking member 37 (see FIG. 11). Around the rotor 41 a vacuum chamber 42 may be provided, where a negative pressure is generated through a suction pipe (not shown) when the suction cup 39 has achieved the desired angular position. The suction causes the blocking member 37 to be pushed against the seat 43, avoiding the undesired rotation of the rotor 41 and of the blocking member 37 with the respective suction cup 39.

With the control actuators 46, 48 described above it is possible to have a 90° movement of the suction cup 39 between two alternative angular positions. To have four alternative positions it is possible to provide a double structure, with two rotors put over each other and coaxial with each other, each of which is provided with an actuator 46, 48 rotating the respective rotor by 90°.

To avoid bulky construction solutions of this type it is possible to use an electric motor that, by means of a drive, for example a belt or gears, transmits the rotary motion to the suction cup 39 around the axis D-D. The rotation may be a 360° rotation.

However, in some embodiments it could be sufficient that each suction cup 39 is rotatable by less than 360°, for instance only 180° or even only by 90°, for example by means of an actuator of the type shown in FIGS. 8 and 12. In this case it is sufficient to mount correctly the single suction cups 39 on the various carriages 35, so that the two alternative positions that the cups may take are sufficient to block all the workpieces that can be machined by the machine tool 1.

In such embodiments, the suction cup and the relevant carriage on which it is supported are adapted to mount the suction cup on the carriage in at least two angular positions, selectively. Coupling members can be provided for this purpose, e.g. front coupling members. The coupling members can be adapted to connect the suction cup 39 to the carriage in two or more alternative angular positions. Once coupled to the carriage, the actuator can then swing the suction cup around a limited angle (e.g. 90°), to selectively move the suction cup from one to the other of two angular positions.

Figure 13A:
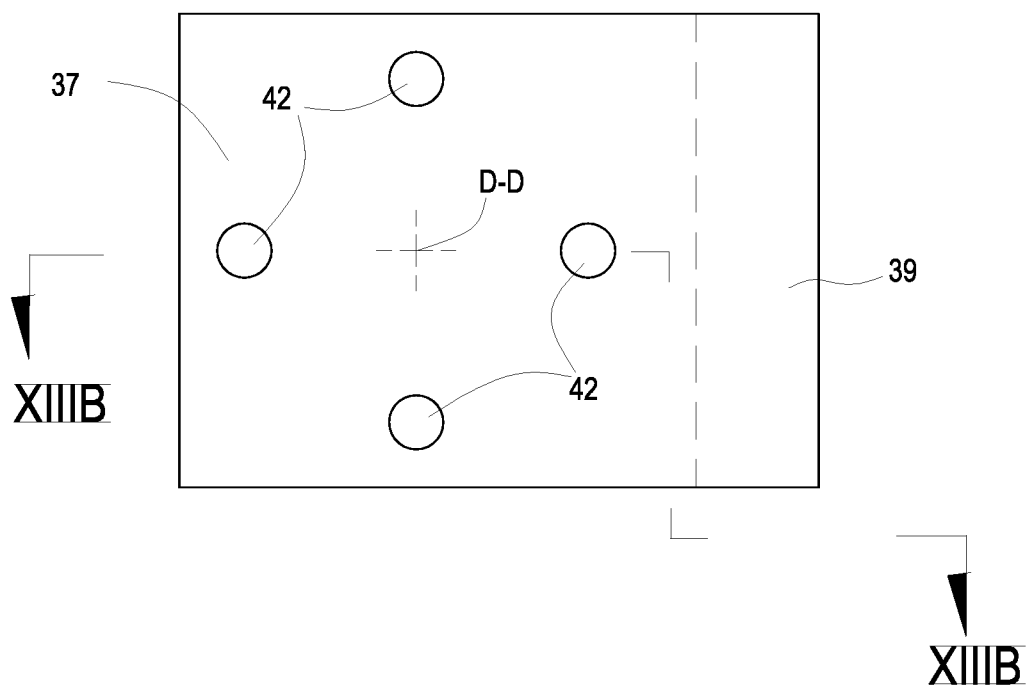
FIGS. 13A-13F show an exemplary diagram of the possible positioning of a suction cup of the type illustrated in FIGS. 8 and 12 on the beam and of the possible positions of the suction cup that can be set by rotating it.
Figure 13B:
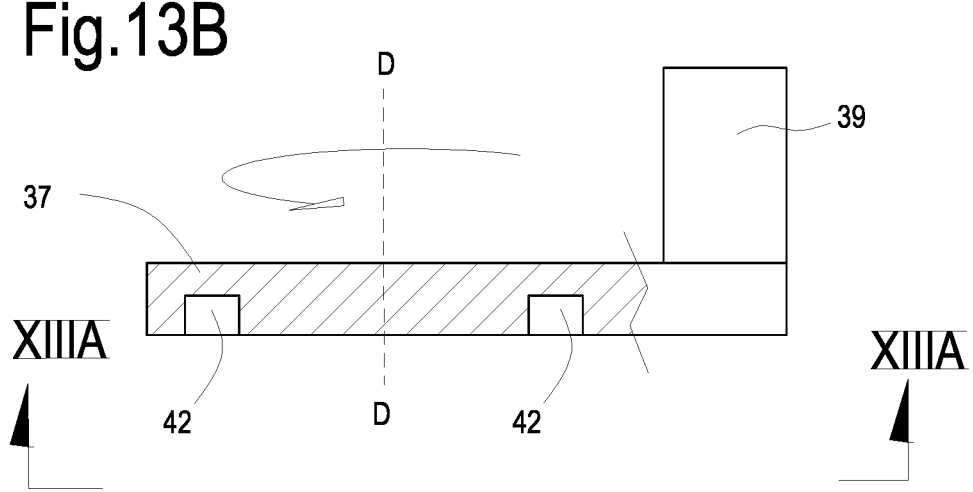
Figure 13C:
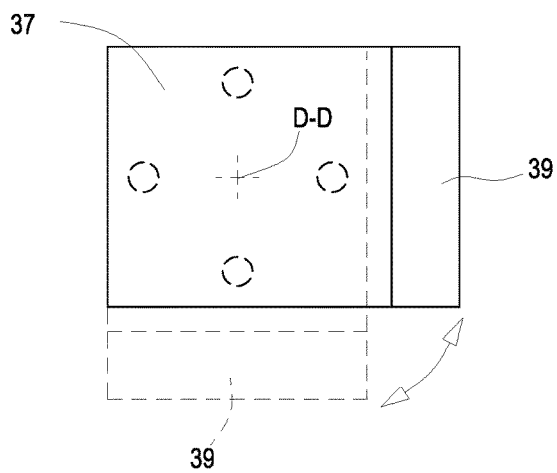
Figure 13D:
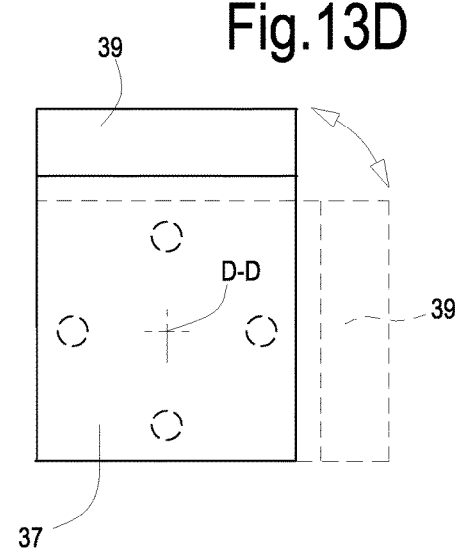
Figure 13E:
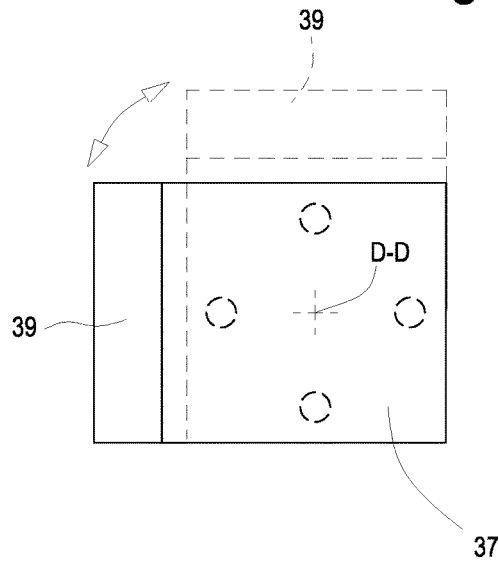
Figure 13F:
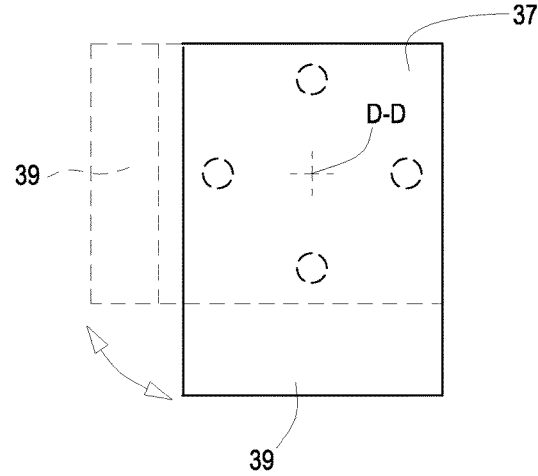

FIGS. 13A, 13B respectively show a bottom view according to the line XIII-XIIIA of FIG. 13A and a cross-section according to XIIIB-XIIIB of a blocking member 37 with the respective suction cup 39, configured to take four different positions coupled to a rotor 41 of a carriage 35. As shown in these figures, the blocking member 37 comprises four holes 44 arranged around the axis D-D and able to co-act with pins forming the front coupling 41X of the rotor 41. In this way, the suction cup 39 may be coupled to the rotor 41 in four distinct angular positions, offset by 90° with respect to one another. As the rotor 41 can rotate by 90°, once mounted each suction cup can take two distinct positions, offset by 90°. Based on how the suction cups are mounted on the rotor, different orientations, with respect to the axis D-D, will be possible of the two alternative positions the suction cup can assume when it is rotated by means of the rotor 41.

Each of FIGS. 13C, 13D, 13E, 13F shows, in solid line, one of the four positions in which the suction cup 39 can be mounted with respect to the rotor carried by the corresponding carriage 35. In broken line is indicated the second position, rotated by 90° with respect to the first position, the suction cup can take due to the rotation imparted to the rotor 41 by means of the actuator 46, 48. By observing for example FIGS. 13C-13F and FIG. 3, it is easily understood that all the positions of the suction cups 39 of the right workpiece holder 30 can be obtained through a 90° rotation of the suction cups 39 of the left workpiece holder 30, once the initial angular position of each suction cup 39 has been suitably chosen among the four positions shown in continuous line in FIGS. 13C-13F.

With this arrangement it is possible to have a very versatile machine, allowing a fast set-up of the position of the suction cups 39, using a very simple actuator 46, 48 that is not expensive and has limited bulk.

The movement of each carriage 35 along the respective beam 31 may be controlled by means of a servo-motor controlled by the central control unit 17. Details of a possible embodiment of the system for moving the carriages are described below with particular reference to FIGS. 6 to 9.

In some embodiments, each carriage 35 may be equipped with an electronically controlled electric actuator 51. The actuator 51 may comprise an electric motor and the related actuation. The actuator 51 may be carried by a side panel of the carriage 35. The actuator is preferably carried by the side panel 38A that has a vertical extension greater than the side panel 38B. The electric motor of each actuator 51 may drive into rotation a pinion 53 meshing with a respective rack 55. One or two carriages are arranged on a beam 31, and they may be mounted with the respective side panels 38A on a side of the beam 31 and the respective pinions 53 of the actuators 51 may mesh with a common rack 55. In case more than two carriages 35 are provided on a beam, for example four carriages 35 as in the illustrated example, the beam is preferably associated with two racks 55 arranged on the two sides of the beam. Each rack 55 meshes with two respective pinions of two carriages 35. The carriages are advantageously arranged alternate, as shown in FIG. 6, with adjacent carriages 35 arranged so that the respective actuators 51 and the pinions 53 are arranged on opposite sides of the beam 31.

The rack(s) 55 is(are) preferably arranged below the corresponding guide 33, as shown in particular in FIG. 8, and preferably in such a position as to remain, in a top view, underneath the guides 33.

To supply electricity, any hydraulic power or pneumatic power, the suction line for the suction cups 39, and the control signals to each carriage 35 and to the devices associated therewith, pipes and cables may be provided, housed in a guide 61 for each carriage 35. The cables and pipes are schematically indicated with 63 (see FIG. 8). The guide 61 is formed by an open flexible member having two ends 61A, 61B. The end 61B is fastened to the respective carriage 35, whilst the end 61A is fastened to a point fixed with respect to the corresponding beam 31. The flexible member forming the guide 61 forms (FIG. 6) an upper rectilinear segment 61C, a lower rectilinear segment 61D and a curved segment 61E joining together the segments 61C, 61D.

The radius of curvature of the segment 61E defines, together with the thickness of the guide 61, the overall vertical dimension H of the volume occupied by the guide 61, i.e. the height of the overall transverse cross-section of the guide 61 according to a plane orthogonal to the longitudinal extension of the respective beam 31. The width of the volume occupied by the guide 61 is given by the width L of the same guide (see FIGS. 7, 8 and 9), i.e. by the dimension of the guide 61 in a direction orthogonal to the longitudinal extension of the beam 31 and orthogonal to the side of the beam 31.

In advantageous embodiments, the actuator 51 controlling the carriage 35 is at least partially housed inside the volume with dimensions H×L defined by the guide 61, as shown for example in FIG. 8. To reduce the height of the workpiece holder, the actuator 51 is advantageously completely arranged inside the dimension defined by the vertical dimension H. In other words, the position and the vertical bulk of the actuator 51 of each carriage are such that the actuator is integrally housed between the outer (upper and lower) surfaces of the flexible member forming the guide 61.

In some embodiments, the actuator 51 may project beyond the width L of the guide 61. However, preferably, as shown in the embodiment illustrated in the drawing, each actuator 51 is completely contained in the section H×L of the guide and has therefore a transverse dimension (orthogonal to the side of the beam 31) equal to, or lower than, the width L of the flexible member or guide 61. In this way the transverse bulk of each carriage 35 and of the respective actuator is reduced, and this allows for example to reduce the minimum distance at which two beams 31 of the same workpiece holder 30 may be arranged.

In advantageous embodiments, the width, in a top view, of the guide 61 and of the actuator 51 is equal to, or lower than, the width of the space available between the side panel 38A of the carriage and the beam 31.

Advantageously, one of the beams 33 of the carriage 35 is above the guide 61 and above the actuator 51.

With this arrangement, the overall transverse bulk is reduced of the carriage 35 and of the accessories associated therewith, in particular the actuator 51 and the guide 61, so that the beams 31 of each workpiece holder may be put close to one another at a minimal distance to allow supporting small workpieces.

In the illustrated embodiment described above, each carriage 35 has a respective actuator 51 for the positioning along the respective beam 31. In this way, a very quick setting is achieved, as it is possible simultaneously to position all the carriages 35 in the desired position. However, in less expensive embodiments, the carriages 35 may be moved by means of a single actuator, for example an electric motor, moving an endless belt. The belt may extend parallel to the beam 31 and the carriages may be configured to engage selectively the belt so as to be drawn by the belt along the beam 31 to the desired positions. Suitable brakes stop each carriage in the required position. In this case the carriages are positioned one at a time.

In advantageous embodiments, as shown in the attached drawing and mentioned above, each beam 31 has a preferably flat upper surface 31S, devoid of guides, as the guides 33 for the carriages 35 are applied along the sides of the beam 31, flush with the surface 31S or preferably at a given distance below it. In FIGS. 7 and 8 the distance between the guides 33 and the upper surface 31S of the respective beam is indicated with "d". This distance may be comprised, for example, between 1 mm and 100 mm, preferably between 1 mm and 20 mm, and is determined based on the need of avoiding any contact between the pieces of equipment to be fastened to the surface 31S and the guides 33.

In this way it is possible to apply pieces of equipment of various type to the surfaces 31S, even very bulky pieces of equipment, for fixing non-flat workpieces. In fact, differently from prior art solutions, the upper surface 31S of the beam 31 does not act as a guide nor carries a guide for the carriages 35. Accordingly, on one hand this surface may be provided with members for coupling and fastening equipment for the workpieces and, on the other hand, this surface does not have criticalities as regards any damages resulting from the interference with these pieces of equipment. In fact, the critical surfaces, which shall not be damaged (for example abraded or the like) are represented by the guides 33 that are placed below the upper surface 31S of the beam 31.

Figure 10:
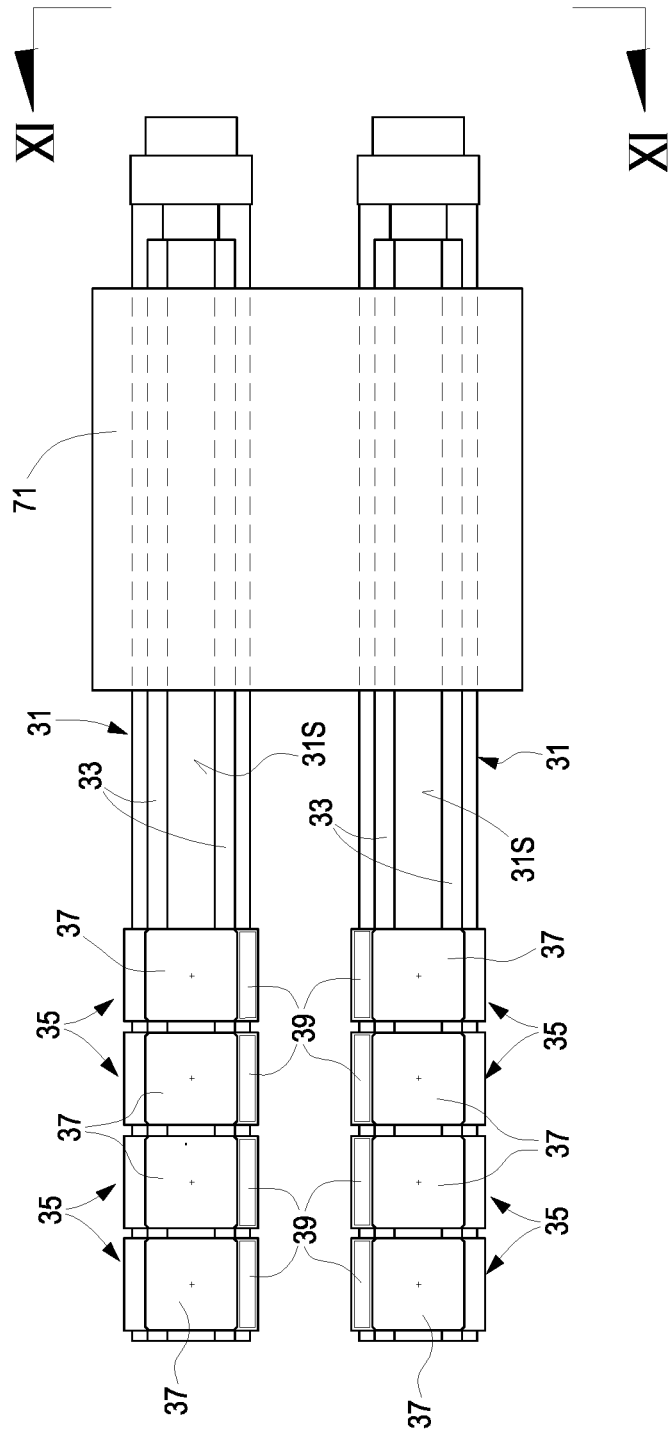
FIG. 10 is a plan view of the machine tool in a particular set-up, according to line X-X of FIG. 11.

In FIGS. 10 and 11 a generic piece of equipment 71 is shown, fixed to the flat upper surfaces 31S of the two beams 31 of a workpiece holder 30. Preferably, in order to leave a greater space for fixing the equipment 71, the carriages 35 of the two beams 31 on which the equipment 71 is fixed may be translated towards an end of the respective beam 31 and put adjacent to one another, as shown in FIG. 10. By arranging the guides 33 of the carriages 35 below the level of the surfaces 31S there are no interferences between the guides 33 and the equipment 71. To fix the equipment 71 to the beams 31, the beams may have, on the upper surface, holes 72 for engaging blocking elements 74 (see FIG. 11).

Whilst in the FIGURES described above a machine tool 1 is illustrated with pairs of beams 31 that can translate according to a numerically controlled axis Y1, Y2 by means of the respective slides 27 on which they are mounted, in other embodiments all the numerically controlled movements of the tool(s) with respect to the workpiece may be assigned to the work head 9, keeping the workpiece holder 30 formed by the beams 31 and the respective pieces of equipment in a fixed position.

FIGS. 14 and 15 show an embodiment of this type. The same numbers indicate equal or equivalent parts to those already described with reference to the previous embodiments. The machine tool 1 has a gantry structure 3 movable according to a numerically controlled translation axis Y, along guides 4 fixed to the floor or fastened to a structure 27, on which also the beams 31 are mounted. The gantry structure 3 has uprights 5 and a crossbar 7. The work head, indicated again with number 9, is movable along guides 15 fixed to the crossbar 7.

In other embodiments, instead of a gantry structure a movable column structure may be provided, i.e. a structure with a single upright 5, to which the crossbar 7 is attached.

The work head 9 is movable along a vertical numerically controlled translation axis Z and along a horizontal numerically controlled translation axis X by means of the guides 15.

In this embodiment, the beams 31 are not mounted on slides movable along bases fixed with respect to the gantry structure. Differently from the embodiments describe above, in this configuration the beams 31 are carried by a bearing structure, indicated again with number 27, with which guides 29 are integral, along which the beams 31 are adjustable. In the illustrated embodiment, an exemplary number of beams 31 has been shown. The number of beams 31 may be different from that illustrated.

Each beam may be movable according to the double arrow f31 so as to be positioned in the required position according to the specific machining of a given workpiece or batch of workpieces. As in the case described above with reference to FIGS. 1 to 13, each beam 31 may be movable along the guides 29 by means of a respective actuator (not shown). Alternatively, there may be provided a number of actuators smaller than the number of beams, for example even only one actuator. A drive member, for example a belt or an endless chain, may selectively transmit motion from the actuator to each one of the beams 31, members being provided, which selectively engage one or the other of the beams 31 to the drive member, to selectively move each beam (or more beams) by means of the same actuator.

Carriages 35 are arranged on the beams 31, in the same way as already described above, with blocking members 37 having suction cups 39 for blocking the workpieces. The suction cups 39 may define one or more planar working surfaces that are substantially horizontal, i.e. parallel to the numerically controlled axes X, Y.

In the machine of FIGS. 14 and 15 all the numerically controlled movements between tool and workpiece are assigned to the work head 9, whilst the beams 31 are only provided with adjustment movements.

In the case of FIGS. 14 and 15, the beams 31 and the carriages with the respective pieces of equipment mounted thereon may be substantially the same as those of the embodiments described above.

In further embodiments, the work head 9 may be movable according to a plurality of numerically controlled axes (translation and, if necessary, rotation axes), whilst the beams 31 may be simply movable from a workpiece load position to a work position and from here to an unload position, that can be the same as the work position. This movement can be a movement not numerically controlled, and may provide, for instance, for only two or three fixed positions. In the embodiment of FIGS. 1 to 3 it is for example possible to assign the head a movement according to a third numerically controlled translation axis parallel to the axes Y1, Y2 and to move the slides 27 along the guides 25 with no numerical control, but only between two end positions: a position below or near the gantry 3 and a position far from the gantry 3, for loading and unloading the workpieces.

A further embodiment of a machine tool according to the present disclosure is shown in a plan view in FIG. 16. In this embodiment, the same reference numbers used in the previous FIGURES designate the same or similar elements.

The machine tool of FIG. 16 is again labeled 1 as a whole. In the illustrated embodiment, the machine tool 1 is a gantry machine. It has a gantry 3 with uprights (not shown in FIG.

16) similar to upright 5, and a crossbar 7. A work head 9 is mounted movable on the crossbar 7. The work head 9 may be mounted on a slide 11 by means of sliding guides 13 that are oriented vertically, i.e. orthogonally to the crossbar 7. The slide is movable along the crossbar 7 by means of sliding guides 15 parallel to the crossbar 7.

The work head 9 may be provided with numerically controlled according to a first numerically controlled translation axis X, parallel to the crossbar 7 and to the guides 15, and according to a second numerically controlled translation axis Z, vertical and parallel to the guides 13.

The work head 9 may bear one or more electro-spindles that can be provided with one or more rotating tools.

In some embodiments, one of which will be described below, the work head 9 may be adapted to move according to a third numerically controlled translation axis, orthogonal to the axes X and Z.

In the illustrated embodiment, two substantially parallel bases 23 are associated with the gantry 1. In other embodiments only one base may be provided. In the illustrated embodiment, each base 23 extends in a horizontal direction substantially at 90° with respect to the crossbar 7, and extends below said crossbar.

On each base 23 guides 25 may be provided, along which respective slides 27 move. The movement of each slide 27 may be controlled according to a third numerically controlled translation axis, indicated with Y1 and Y2 for the two slides 27. As described above in connection with FIGS. 1 to 3, the slides 27 may work in alternative: when a slide 27 is in work position, in the work area of the work head 9, the other slide 27 is in a workpiece load and/or unload position, spaced from the work head 9. In FIGS. 2 and 3 the two slides are shown both in the load and/or unload position.

In the illustrated embodiment, on each slide 27 guides 29 are provided, that can be oriented at 90° with respect to the guides 25. In other embodiments, the guides 29 may be parallel to the guides 25.

In the illustrated embodiment, on the guides 29 of each slide 27 three beams 31 are provided, that have a longitudinal extension (i.e. the greater dimension) orthogonal to the guides 29. Each beam 31 is adjustable along the guides 29. In this way it is possible to adjust the position of each beams 31 relative to the slide 27 and it is further possible to adjust the reciprocal distance between adjacent beams 31 in the direction of the guides 29. The position of each beam 31 along guides 29 can be adjusted by means of one or more actuators. Schematically, in FIG. 16 an actuator 32 supported by the respective slide 27 is provided, that can engage selectively one or the other of the beams 31 mounted on the slide. Alternatively, each beam 31 can be provided with an independent actuator 32. For instance, each actuator 32 of each beam 31 may control the rotation of a pinion meshing with a rack integral with the slide 27, such that each beam 31 can be moved parallel to the guides 29 and placed in the selected position.

As described above, also with the arrangement of FIG. 16, it is possible to move workpieces mounted on the beams 31 relative to the work head 9 and to the tool 21 according to three numerically controlled translation axes X, Y1 (Y2), Z. The movements are imparted partly to the work head 9 (axes X, Z) and partly to the workpieces (axis Y1 or Y2). In further embodiments, the work head 9 may be provided with movements according to three numerically controlled translation axes X, Y, Z, whilst the beams 31 on which the workpiece is blocked may be mounted on a fixed structure instead of on a slide 27 movable along the axis Y1 or Y2, however ensuring the possibility of adjusting the reciprocal distance between the beams 31. An embodiment of this type will be described below.

On each beam 31, guides 33 are provided, along which a plurality of carriages 35 are slidingly mounted. Each carriage 35 can move along the respective beam 31 as described above. In the embodiment of FIG. 16 three carriages 35 are slidingly mounted on each beam 31. A different number of carriages, for instance at least two, but possibly more than three carriages can be provided on each beam. The number of carriages per beam may differ from one beam to the other.

Carriages 35 are arranged on the beams 31, in the same way as already described above. Each carriage 35 may include a blocking member 37 having a respective suction cup 39 for blocking the workpieces. The suction cups 39 may define one or more planar working surfaces that are substantially horizontal, i.e. parallel to the numerically controlled axes X, Y. As in the previously described exemplary embodiments, shown in FIGS. 1 to 15, each suction cup 39 has preferably an elongated shape, with a long side and a short side.

Some of the suction cups may be rotatably supported on the respective carriage 35. In some embodiments, as described above, some of the blocking members 37 are rotatable around an axis D-D which is orthogonal to the plane defined by axes X and Y1, Y2, i.e. orthogonal to the planar surface defined by the suction cups 39 and on which workpieces are blocked by the suction cups 39.

In the exemplary embodiment of FIG. 16 at least the suction cups 39 of the central beam 31 can rotate by preferably at least 90° around vertical axis D-D. This is pictorially shown in FIG. 16 in that the suction cups 39 arranged on the intermediate beam 31 of the slide 27 on the left-hand side of FIG. 16 are oriented parallel to the longitudinal extension of the beam 31, while the suction cups 39 arranged on the intermediate beam 31 of the slide 27 on the right-hand side of FIG. 16 are oriented orthogonal to the longitudinal extension of the beam 31.

By providing at least the suction beams 39 of the central beam with a rotary motion of at least 90°, very small workpieces can be machined as described above.

The remaining suction cups 39, i.e. the suction cups mounted on the left-hand and right-hand side beam 31 of each slide 27 can be rotatable similarly to the suction cups 39 of the intermediate beams 31. In other, currently less preferred embodiments, the suction cups 39 of the side beams 31 on each slide 27 can be mounted in an angularly fixed position.

In all embodiments shown above, each elongated suction cup 39 is arranged eccentrically with respect to the rotation axis D-D of the respective blocking member 37. The eccentricity can such that the suction cup 39 can be located parallel to one or the other of the side of the respective carriage 35. In some embodiments, the eccentricity of at least some of the rotatable suction cups with respect to the rotation axis D-D can be such that the suction cup can be positioned beyond within the footprint of the respective carriage 35, or even outside the footprint of the respective carriage.

In currently less preferred embodiments, each suction cup 39 or some of them may be arranged in a central position on the respective carriage, i.e centered with respect to the rotation axis D-D.

What is claimed is:
1. A machine tool comprising:
at least one work head adapted to support at least one tool;

at least one workpiece holder comprising at least a first beam and a second beam; wherein the first beam and the second beam are parallel to one another and wherein a distance between the first beam and the second beam is adjustable by a first actuator orthogonally to a longitudinal extension of the first beam and the second beam;

on each said first beam and second beam at least a first carriage and a second carriage movable along the longitudinal extension of the respective first beam and second beam;

for each said first carriage and second carriage, a respective second actuator adapted to control the movement of each respective carriage along the respective first beam and second beam;

on each carriage, a suction cup for blocking the work pieces to be machined;

wherein:

each suction cup has an elongate shape with a long side and a short side;

the suction cups of each said first carriage and second carriage of the first beam and second beam are co-planar and cumulatively define a planar blocking surface adapted to block a planar workpiece;

at least along said first beam each suction cup is supported by a blocking member rotatably coupled to a respective rotor; wherein the rotor is rotatably mounted on the respective carriage around a cup rotation axis, each cup rotation axis being orthogonal to said planar blocking surface; and a rotation actuator is arranged on each carriage of said first beam, within a footprint of each carriage and between the respective blocking member and each carriage, the rotation actuator adapted to rotate the respective blocking member and the suction cup around the respective cup rotation axis, the rotation actuator being housed in the respective carriage, between a first side panel and a second side panel of the carriage and above an upper surface of the respective beam.

2. The machine tool of claim 1, wherein each suction cup of the first beam is mounted eccentrically with respect to the respective cup rotation axis and to the respective carriage so that, by rotating the suction cup with respect to the carriage, the position of the eccentricity of the suction cup with respect to the carriage carrying the cup can be changed.

3. The machine tool of claim 2, wherein each carriage comprises four sides, two of which are parallel to, and two of which are orthogonal to, the longitudinal extension of the beam onto which the carriage is mounted, and wherein each suction cup of the first beam is angularly adjustable such that it can be arranged eccentrically with respect to the carriage carrying the suction cup selectively along at least two of said sides, so as to take two alternative positions, which are eccentric with respect to the carriage.

4. The machine tool of claim 2, wherein each carriage comprises four sides, two of which are parallel to, and two of which are orthogonal to, the longitudinal extension of the beam onto which the carriage is mounted, and wherein each suction cup of the first beam is angularly adjustable such that it can be arranged eccentrically with respect to the carriage carrying the suction cup selectively along at least three sides, so as to take three alternative positions, which are eccentric with respect to the carriage.

5. The machine tool of claim 2, wherein each carriage comprises four sides, two of which are parallel to, and two of which are orthogonal to, the longitudinal extension of the beam onto which the carriage is mounted, and wherein each suction cup of the first beam is angularly adjustable such that it can be arranged eccentrically with respect to the carriage carrying the suction cup selectively along all four sides so as to take four alternative positions, which are eccentric with respect to the carriage.

6. The machine tool of claim 1, wherein each rotation actuator controlling the rotation of the suction cups is controlled by a programmable unit.

7. The machine tool of claim 1, wherein each rotation actuator controlling the rotation of the suction cups is controlled by a numerically controlled axis.

8. The machine tool of claim 1, wherein the first beam and second beam are mounted on a slide movable along a numerically controlled translation axis.

9. The machine tool of claim 1, wherein the work head is movable along at least two numerically controlled translation axes.

10. The machine tool of claim 1, wherein the work head is movable according to at least one numerically controlled rotation axis.

11. The machine tool of claim 1, wherein at least some of said suction cups and the rotation actuators controlling the rotation thereof are adapted to impart the suction cups a rotation of at least 180°.

12. The machine tool of claim 1, wherein at least some of said suction cups and the rotation actuators controlling the rotation thereof are adapted to impart the suction cups a rotation of at least 360°.

13. The machine tool of claim 1, wherein at least some of said suction cups and the rotation actuators controlling the rotation thereof are adapted to impart the suction cups a rotation of less than 360° and wherein the suction cups are adapted to be mounted on the carriages in a plurality of alternative angular positions.

14. The machine tool of claim 13, comprising coupling means adapted to selectively couple the suction cup to the respective carriage in at least two alternative angular positions around the axis of rotation of the suction cup with respect to the carriage.

15. The machine tool of claim 1, wherein each blocking member is adapted to be coupled to the respective rotor in at least two angular positions around the cup rotation axis.

16. The machine tool of claim 1, wherein each blocking member and respective rotor comprise a mechanical coupling feature adapted to connect the blocking member to the respective rotor in a first angular position and in a second angular position.

17. The machine tool of claim 1, wherein the rotation actuator is positioned between the upper surface of the respective beam and the respective blocking member.

18. The machine tool of claim 1, wherein the rotation actuator is positioned between the upper surface of the respective beam and the respective rotor.

* * * * *